United States Patent
Brown et al.

(10) Patent No.: US 10,162,563 B2
(45) Date of Patent: Dec. 25, 2018

(54) ASYNCHRONOUS LOCAL AND REMOTE GENERATION OF CONSISTENT POINT-IN-TIME SNAP COPIES

(71) Applicant: International Business Machines Corporation, Armonk, NY (US)

(72) Inventors: Theresa M. Brown, Tucson, AZ (US); Anthony J. Ciaravella, Tucson, AZ (US); Nicolas M. Clayton, Cheshire (GB); Michael S. Gagner, Tucson, AZ (US); Theodore T. Harris, Jr., Tucson, AZ (US); Mark L. Lipets, Tucson, AZ (US); Gregory E. McBride, Vail, AZ (US); Carol S. Mellgren, Tucson, AZ (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 15/368,321

(22) Filed: Dec. 2, 2016

(65) Prior Publication Data
US 2018/0157421 A1  Jun. 7, 2018

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01); *G06F 3/0619* (2013.01); *G06F 3/0659* (2013.01)

(58) Field of Classification Search
CPC ...... G06F 3/0604; G06F 3/0619; G06F 3/065; G06F 3/0659; G06F 3/067
See application file for complete search history.

(56) References Cited

U.S. PATENT DOCUMENTS 8,195,770 B1   6/2012   Aral et al.
8,745,006 B2   6/2014   Hiwatashi et al.
(Continued)

FOREIGN PATENT DOCUMENTS

CN   100403272     7/2008
CN   105718220 A   6/2016

OTHER PUBLICATIONS ip.com "GMIR Consistency Group Formation—Surrender Mechanism", dated Jun. 29, 2010, An IP.com Prior Art Database Technical Disclosure, Total 3 pages.

(Continued)

*Primary Examiner* — Aracelis Ruiz
(74) *Attorney, Agent, or Firm* — William K. Konrad; Konrad, Raynes, Davda and Victor LLP

(57) ABSTRACT

In accordance with one embodiment, asynchronous local and remote generation of consistent first and second point-in-time snap copy volumes provides for generating in a primary system, a first point-in-time snap copy volume of a primary volume of the primary system, and generating in a secondary system, a second point-in-time snap copy volume utilizing a secondary volume in the secondary system. Synchronizing logic synchronizes the first and second point-in-time snap copy volumes to be consistent with each other as of a particular point-in-time notwithstanding an asynchronous mirror relationship between the primary volume of the primary system and the secondary volume of the secondary system. Other features and aspects may be realized, depending upon the particular application.

24 Claims, 12 Drawing Sheets

(56) References Cited

U.S. PATENT DOCUMENTS

| | | |
|---|---|---|
| 2004/0243775 A1 | 12/2004 | Coulter et al. |
| 2004/0260735 A1 | 12/2004 | Martinez et al. |
| 2005/0177693 A1 | 8/2005 | Nahum |
| 2007/0094465 A1 | 4/2007 | Sharma et al. |
| 2007/0234105 A1 | 10/2007 | Quinn et al. |
| 2009/0259817 A1 | 10/2009 | Sharma et al. |
| 2010/0235591 A1 | 9/2010 | Akutsu et al. |
| 2012/0079224 A1* | 3/2012 | Clayton .............. G06F 11/1456 711/162 |
| 2012/0254114 A1* | 10/2012 | Gundy .............. G06F 17/30088 707/639 |
| 2012/0254124 A1 | 10/2012 | Gundy et al. |
| 2014/0108345 A1* | 4/2014 | Brown .............. G06F 17/30575 707/624 |
| 2014/0304470 A1 | 10/2014 | Shanbhag et al. |
| 2015/0081628 A1 | 3/2015 | Brown et al. |

OTHER PUBLICATIONS ip.com "A Method and System for Providing an Efficient Concurrent 3-Way Replication Continuity for Consistency Groups during Source Fail-Over", dated Dec. 3, 2014, An IP.com Prior Art Database Technical Disclosure, Total 5 pages.

Machine Translation for CN100403272, published Jul. 16, 2008, Total 14 pages.

English Translation of CN105718220A, published Jun. 29, 2016, Total 3 pages.

International Search Report and Written Opinion, dated Mar. 1, 2018, for International Application No. PCT/IBM2017/057067, Total 10 pages.

* cited by examiner

ASYNCHRONOUS LOCAL AND REMOTE GENERATION OF CONSISTENT POINT-IN-TIME SNAP COPIES

BACKGROUND OF THE INVENTION

1. Field of the Invention

The present invention relates to a computer program product, system, and method for asynchronous local and remote generation of consistent point-in-time snap copies.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Thus, data from a host to be stored in the data storage system is typically directed to a primary system at a local site and then replicated to secondary system which may be geographically remote system from the primary system.

The process of replicating, that is, copying data over to the secondary system can be setup in either a synchronous or asynchronous relationship between the primary system and the secondary system. In a synchronous relationship, any updates to the primary system are typically synchronized with the secondary system, that is, successfully copied over to the secondary system, before the primary system reports to the host that the data storage input/output operation has been successfully completed. As a result, data storage to a primary storage system and a secondary system in a synchronous relationship may adversely affect system performance of the host while the host awaits completion of the synchronous copy operations. In storage systems in which the primary and secondary systems are widely separated, delays to completion of the synchronous copy operations may be greater, which can further adversely affect host performance. For example, in storage systems in which the primary system and the secondary system are separated by a geographical distance of 300 kilometers (Km) or more, for example, there can be a delay of 3-5 seconds (or more) before the data is successfully replicated at the secondary system.

As a result, storage systems frequently employ an asynchronous relationship between a primary system and a secondary system, particularly if the secondary system is geographically distant from the primary system. In an asynchronous relationship, successful updates to the primary system are typically reported to the host as a successful storage input/output operation without waiting for the update to be replicated to the secondary system. As a result, the host need not wait for the data replication to the secondary system to be completed, and the performance of the host system may be enhanced accordingly.

As the name suggests, in an asynchronous relationship, the primary system and the secondary system may not be fully synchronized at any one time. Thus, data stored on the secondary system typically lags that stored in the primary system. Accordingly, new data stored on a primary system may not be stored on the secondary system for an interval of time such as 3-5 seconds, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

A near instantaneous copy of a volume may be generated using a point-in-time snap copy function such as the IBM® FlashCopy function, for example. The point-in-time snap copy function creates a "snapshot" of the contents of a source volume as of a particular time in a target volume which may be referred to as the point-in-time snap copy volume. One version of a point-in-time snap copy function transfers the contents of the source volume to the point-in-time snap copy volume in a background copy operation.

A target bitmap having a bit for each track of the point-in-time snap copy volume, is used to indicate tracks which have not yet been transferred to the point-in-time snap copy volume. As the contents of each track of the source volume is copied to the target volume, the corresponding bit of the target bitmap is updated to indicate successful transfer of the contents for the associated track. Any read operations directed to a track of the point-in-time snap copy volume which has not yet received the contents of the corresponding track of the source volume, are redirected to obtain the contents of that track from the source volume. Accordingly, the contents of a point-in-time snap copy volume are immediately available albeit indirectly, before any tracks have actually been transferred to the target volume. Conversely, if the host directs an update to a track of the source volume before the contents of that track have been transferred to the point-in-time snap copy volume, the contents of the track of the source volume are transferred to the point-in-time snap copy volume before the update is permitted to overwrite the contents of that track of the source volume.

Another version of a point-in-time snap copy function omits the background copy operation. Thus, the contents of the source volume are not transferred to the point-in-time snap copy volume in a background copy operation. Accordingly, any read operations directed to a track of the point-in-time snap copy volume are usually redirected to obtain the contents of that track from the source volume. However, if the host directs an update to a track of the source volume, the contents of the track of the source volume are transferred to the point-in-time snap copy volume before the update is permitted to overwrite the contents of that track of the source volume.

In a synchronous data replication system, a point-in-time snap copy volume may be made of a primary volume at the primary system with respect to the contents of the primary volume as of a particular point-in-time, and a point-in-time snap copy volume may be made of a secondary volume at the secondary system with respect to the contents of the secondary volume as of the same point-in-time. Because the primary and secondary volumes are synchronized, the respective point-in-time snap copy volumes will also be synchronized and therefore consistent with each other notwithstanding that the point-in-time snap copy volumes are made in different places, that is, the primary system and the secondary system.

In an asynchronous data replication system, a point-in-time snap copy volume may also be made of a primary volume at the primary system with respect to the contents of the primary volume as of a particular point-in-time. Similarly, a point-in-time snap copy volume may be made of a secondary volume at the secondary system with respect to the contents of the secondary volume as of a particular point-in-time. However, because the primary and secondary volumes are not synchronized, the respective point-in-time snap copy volumes will also not be synchronized and therefore will not be consistent with each other. Hence, to provide a backup copy of a point-in-time snap copy volume of a primary volume at the primary system, the point-in-time snap copy volume generated at the primary system is typically transferred over a network to the secondary system.

To maintain a degree of consistency of data across multiple volumes at a secondary system, the IBM® Total Storage disk subsystem Peer-to-Peer Remote Copy (PPRC) function supports the concept of a PPRC consistency group. Volumes in a PPRC relationship that are configured into a PPRC Consistency Group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

SUMMARY

One general aspect of asynchronous local and remote generation of consistent point-in-time snap copies in accordance with the present description, includes mirroring data asynchronously from a first data unit such as a primary volume stored in a first storage unit at a first location such as a primary system, for example, to a second data unit such as a secondary volume stored in a second storage unit at a second location such as a secondary system, for example. Data of the first data unit is copied as of a first point-in-time to a third data unit to initiate a first point-in-time snap copy of the first data unit. In addition, data of the second data unit is copied as of a second point-in-time to a fourth data unit to initiate a second point-in-time snap copy of the second data unit. In one aspect of the present description, data of the fourth data unit is synchronized to data of the first unit as of the first point-in-time, wherein the synchronizing includes copying selected data from at least one of the first data unit and the third data unit to the fourth data unit. As a result, both the third and fourth data units provide consistent point-in-time snap copies of the data of the first data unit as of the first point-in-time while reducing the amount of data transferred over a network between the primary system and the secondary system to generate the consistent point-in-time snap copies of the data of the first data unit.

In one embodiment, copying data of the first data unit as of a first point-in-time to a third data unit includes executing a first point-in-time snap copy command, where executing the first point-in-time snap copy command includes generating a first target bitmap indicating tracks which have not been copied from the first data unit to the third data unit as of the first point-in-time. Accordingly, data for the third data unit to provide a consistent point-in-time snap copy of the data of the first data unit as of the first point-in-time may be obtained by data transfers within the primary system.

In yet another aspect of the present description, operations include quiescing host input to the first data unit and after quiescing host input/output to the first data unit, idling mirroring of data from the first data unit to the second data unit. In another aspect of the present description, mirroring data from the first data unit to the second data unit includes generating a first out-of-synch bitmap indicating remaining tracks to be mirrored from the first data unit to the second data unit. The first out-of-synch bitmap (as of the first point-in-time) may be copied to a second out-of-synch bitmap to indicate remaining tracks selected to be copied from at least one of the first data unit and the third data unit to the fourth data unit. Copying data of the second data unit as of the second point-in-time to a fourth data unit may include executing a second point-in-time snap copy command to generate a second target bitmap indicating tracks which have not been copied from the second data unit to the fourth data unit as of the second point-in-time. In one embodiment, following generation of the bitmaps, operations may include unquiescing host input to the first data unit. In addition, mirroring of data from the first data unit to the second data unit may be restarted. As a result, updates to the primary system may be mirrored to the secondary system while the third and fourth data units are being generated to provide consistent point-in-time snap copies of the data of the first data unit as of the first point-in-time.

In still another aspect, the second target bitmap may be processed to copy tracks from the second data unit to the fourth data unit as indicated by the second target bitmap. In one embodiment, such copying data of the second data unit as of second point-in-time to a fourth data unit further may include background copying tracks of the second data unit to the fourth data unit if the second target bitmap indicates data tracks remain to be copied from the second data unit to the fourth data unit. Accordingly, data for the fourth data unit to provide a consistent point-in-time snap copy of the data of the first data unit as of the first point-in-time may be obtained primarily by data transfers within the secondary system.

In another aspect of the present description, copying selected data from at least one of the first data unit and the third data unit to the fourth data unit to synchronize the data of the fourth data unit to selected data of the first data unit as of the first point-in-time, may include processing the second out-of-synch bitmap and mirroring tracks from at least one of the first data unit and the third data unit to the fourth data unit if indicated as remaining to be mirrored to the fourth data unit. In one embodiment, mirroring tracks from at least one of the first data unit and the third data unit to the fourth data unit includes obtaining data for a data track of the third data unit from the first data unit and mirroring the obtained data to the fourth data unit if the first target bitmap indicates that the data track has not been copied from the first data unit to the third data unit. Copying data of the first data unit as of a first point-in-time to a third data unit may include forming a consistency group of the first data unit and the third data unit as of the first point-in-time. As a result, target and out-of-synch bitmaps may be used in combination to synchronize data units of the primary system and the secondary system to provide consistent point-in-time snap copies of the data of the first data unit as of the first point-in-time while reducing the amount of data transferred over a network between the primary system and the secondary system.

Implementations of the described techniques may include hardware, a method or process, or computer software on a computer-accessible medium. Other features and aspects may be realized, depending upon the particular application.

DETAILED DESCRIPTION

Figure 1:
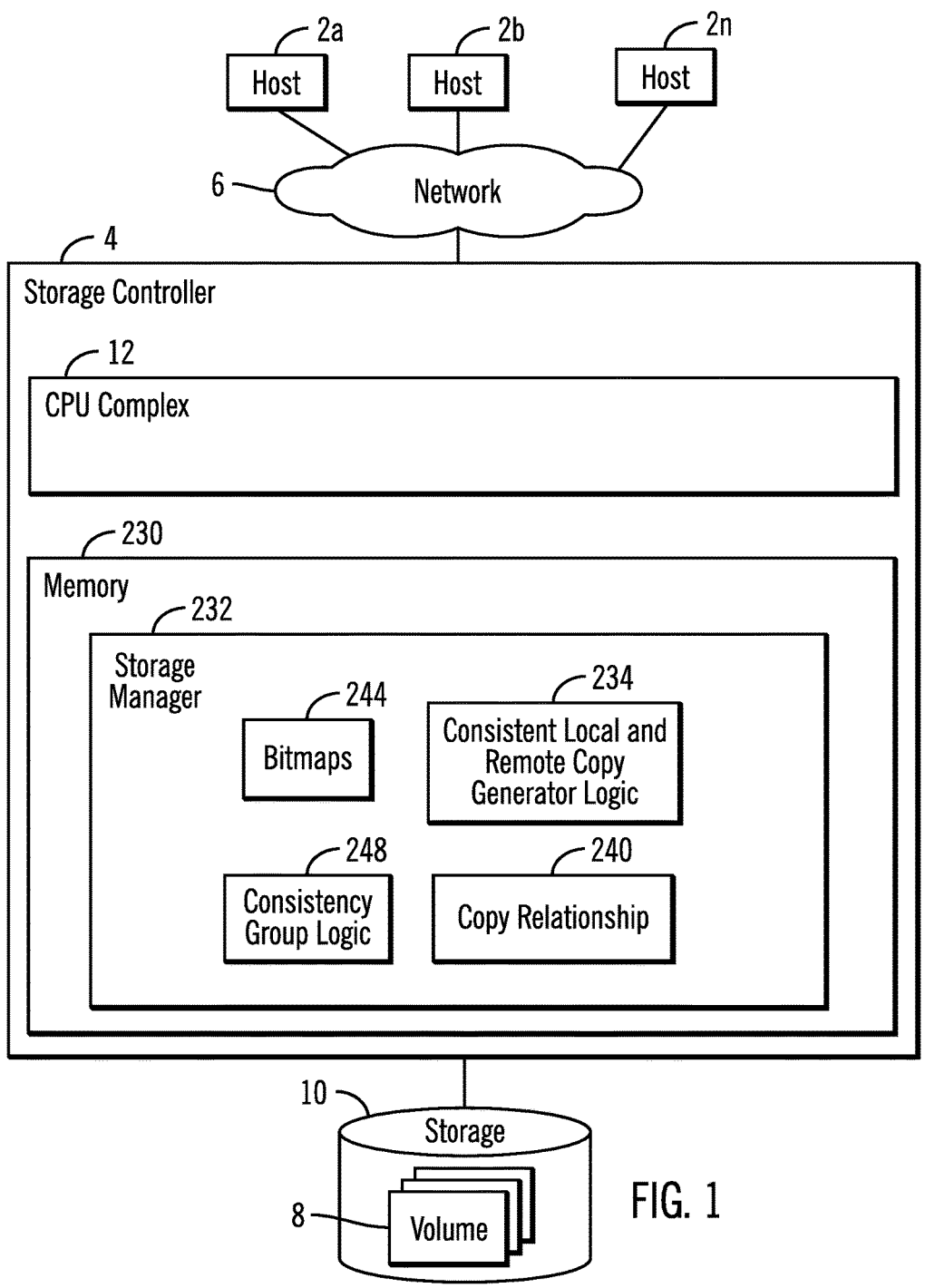
FIG. 1 illustrates an embodiment of a computing environment employing asynchronous local and remote generation of consistent point-in-time snap copies in accordance with one aspect of the present description.

A system of one or more computers may be configured for asynchronous local and remote generation of consistent point-in-time snap copies in accordance with the present description, by virtue of having software, firmware, hardware, or a combination of them installed on the system that in operation causes or cause the system to perform operations for asynchronous local and remote generation of consistent point-in-time snap copies. For example, one or more computer programs may be configured to perform asynchronous local and remote generation of consistent point-in-time snap copies by virtue of including instructions that, when executed by data processing apparatus, cause the apparatus to perform the actions.

As previously noted, in an asynchronous data replication system, a point-in-time snap copy volume may be made of a primary volume at the primary system with respect to the contents of the primary volume as of a particular point-in-time. Similarly, a point-in-time snap copy volume may be made of a secondary volume at the secondary system with respect to the contents of the secondary volume as of a particular point-in-time. However, because the primary and secondary volumes are frequently not fully synchronized in an asynchronous mirror relationship, the respective point-in-time snap copy volumes will also not be synchronized and therefore will not be consistent with each other. Hence, to provide a backup copy of a point-in-time snap copy volume of a primary volume at the primary system, and to store the backup copy at the secondary system, the point-in-time snap copy volume generated at the primary system previously was transferred over a network to the secondary system.

In accordance with one aspect of the present description, it is recognized that in many applications, most of the data to form a point-in-time snap copy volume at the secondary system already resides on the secondary system due to the asynchronous mirror relationship. Accordingly, asynchronous local and remote generation of consistent first and second point-in-time snap copies in accordance with one embodiment of the present description, can obviate much of the transfer of data over a network in creating consistent first and second point-in-time snap copies located at different sites. Asynchronous local and remote generation of consistent first and second point-in-time snap copies in accordance with one embodiment of the present description, provides for copying data from a primary volume of the primary system to a first point-in-time snap copy volume of the primary system pursuant to a point-in-time snap copy relationship which may be a "no background copy" type relationship in one embodiment, and copying data from a secondary volume of the secondary system to a second point-in-time snap copy volume of the secondary system pursuant to a point-in-time snap copy relationship which may be a background copy type relationship in one embodiment. As a result, data for the second consistent point-in-time snap copy volume located at the secondary system may be obtained primarily by data transfers within the secondary system. Similarly, data for the first consistent point-in-time snap copy volume located at the primary system may be obtained by data transfers within the primary system.

However, it is further appreciated that if a mirror relationship is an asynchronous relationship, in some instances not all of the data for a second consistent point-in-time snap copy volume may be found on the secondary system. Accordingly, in one embodiment, synchronizing logic synchronizes the second point-in-time snap copy volume of the secondary system as of a first point-in-time to additional data of the primary volume of the primary system, obtained either directly from the primary volume or indirectly through the first point-in-time snap copy volume of the primary system. In this manner, the second point-in-time snap copy volume may be completed so that it will be consistent with the first point-in-time snap copy volume as of a particular point-in-time. As a result, the amount of data transferred over a network between the primary system and the secondary system to generate the consistent point-in-time snap copies of the data of a primary volume, may be reduced.

A system of one or more computers may be configured for asynchronous local and remote generation of consistent point-in-time snap copies in accordance with the present description, by virtue of having software, firmware, hardware, or a combination of them installed on the system that in operation causes or cause the system to perform asynchronous local and remote generation of consistent point-in-time snap copies operations. Thus, the operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

In the illustrated embodiment, a copy relationship identifies a source storage location, such as a primary storage location, and a target storage location, such as a secondary storage location, in which data stored at the source storage location is to be replicated or otherwise copied to the target storage location. Thus, as used herein, a source storage location and a target storage location are storage locations related by a copy relationship.

Furthermore, as used herein, the term "storage unit" refers to a storage location containing one or more units of data storage such as one or more volumes, cylinders, tracks, segments, extents, or any portion thereof, or other unit or units of data suitable for transfer. Thus, a source storage unit and the associated target storage unit may each be a storage volume. However, it is appreciated that a source storage unit and a target storage unit may each be of a size other than a volume, for example.

Figure 2:
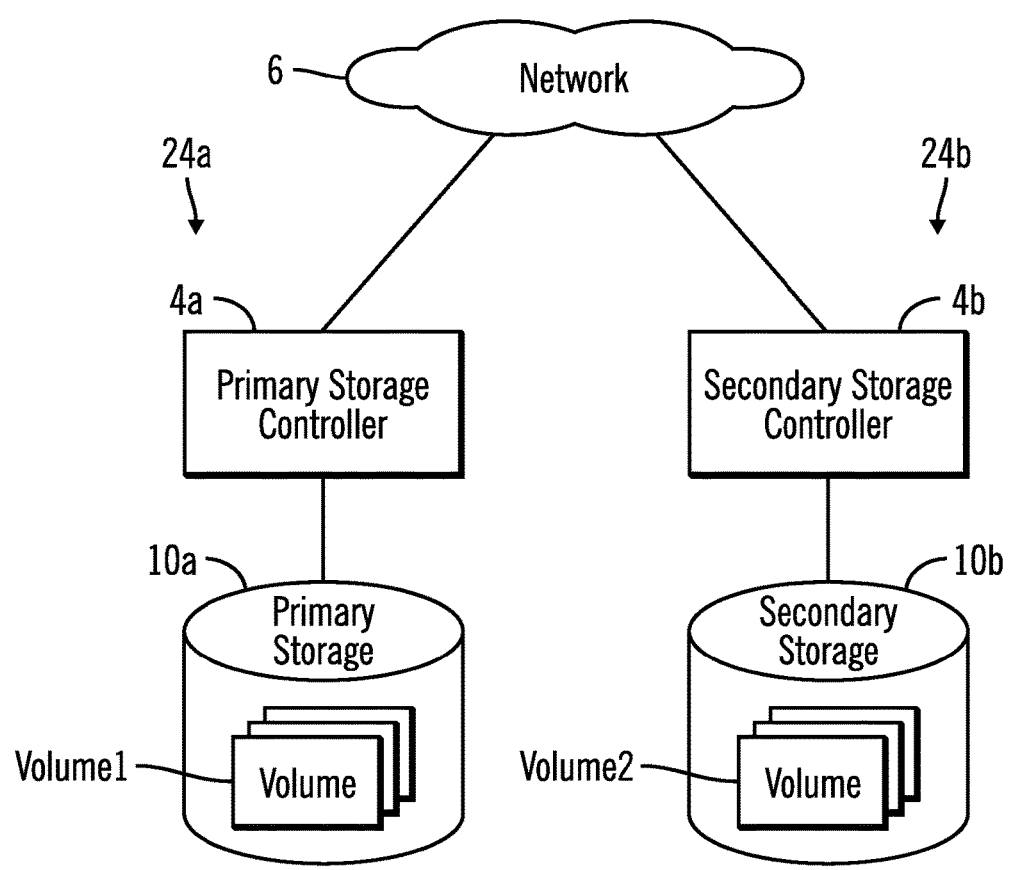
FIG. 2 illustrates an example of a storage system having a primary system and a secondary system employing asynchronous local and remote generation of consistent point-in-time snap copies in accordance with one aspect of the present description.

Implementations of the described techniques may include hardware, a method or process, or computer software on a computer-accessible medium. FIG. 1 illustrates an embodiment of a computing environment employing asynchronous local and remote generation of consistent point-in-time snap copies in accordance with the present description. A plurality of hosts 2a, 2b . . . 2n may submit Input/Output (I/O) requests to one or more storage controllers or storage control units 4, 4a (FIG. 2), 4b (FIG. 2) over a network 6 to access data at volumes 8 (e.g., Logical Unit Numbers, Logical Devices, Logical Subsystems, etc.) in storage represented by one or more storage drives 10, 10a, (FIG. 2), 10b (FIG. 2). Each storage controller 4, 4a, 4b includes a CPU complex 12 (FIG. 1), including one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

In the configuration illustrated in FIG. 2, the storage controller 4a and the data storage 10a have been configured as a primary storage control unit and the primary storage, respectively, of a primary system 24a. Similarly, the storage controller 4b and its data storage 10b have been configured as a secondary storage control unit and a secondary storage, respectively, of a secondary system 24b. Hence, in the configuration depicted in FIG. 2, the storage controller 4a will be referred to as a primary storage controller or control unit 4a, and the data storage 10a will be referred to as a primary storage 10a. Similarly, the storage controller or control unit 4b will be referred to as a secondary storage controller or control unit 4b and the data storage 10b will be referred to as a secondary data storage 10b.

In a particular copy relationship, the source unit is often referred to as the primary and the target unit is often referred to as the secondary. Replication relationships are defined between storage units of the data storage 10a and 10b. Notwithstanding a reference to the data storage 10a as "primary" and the data storage 10b as "secondary," particular storage units of the data storage 10a and the storage 10b may play both a primary (or source role) and a target (or secondary role) depending upon the particular copy relationship.

Figure 3:
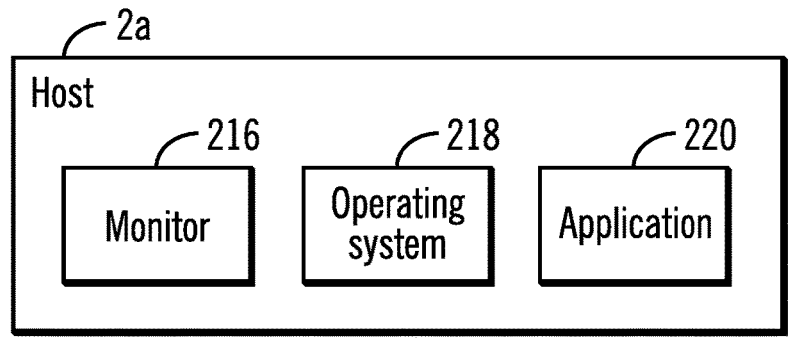
FIG. 3 illustrates an example of a host in the storage system of FIG. 1.

As noted above, the computing environment includes one or more hosts 2a, 2b, 2n (FIG. 1) writing updates to the primary storage controller 4a (FIG. 2) for storage in the primary storage 10a. At least one such host such as the host 2a, has in this embodiment, storage management functions including a monitor program 216 (FIG. 3) to monitor failures in the availability of the primary storage controller 4a (FIG. 2) and its associated data storage 10a. In some embodiments, the monitor program 216 may be operated in a device apart from the hosts.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 6.

A typical host as represented by the host 2a (FIG. 3) includes an operating system 218 and an application 220 that reads data from and writes updates via a storage controller 4a, 4b to the primary storage 10a or secondary storage 10b. A host which includes the monitor program 216 may omit update writing applications 220 in some embodiments.

Figure 4:
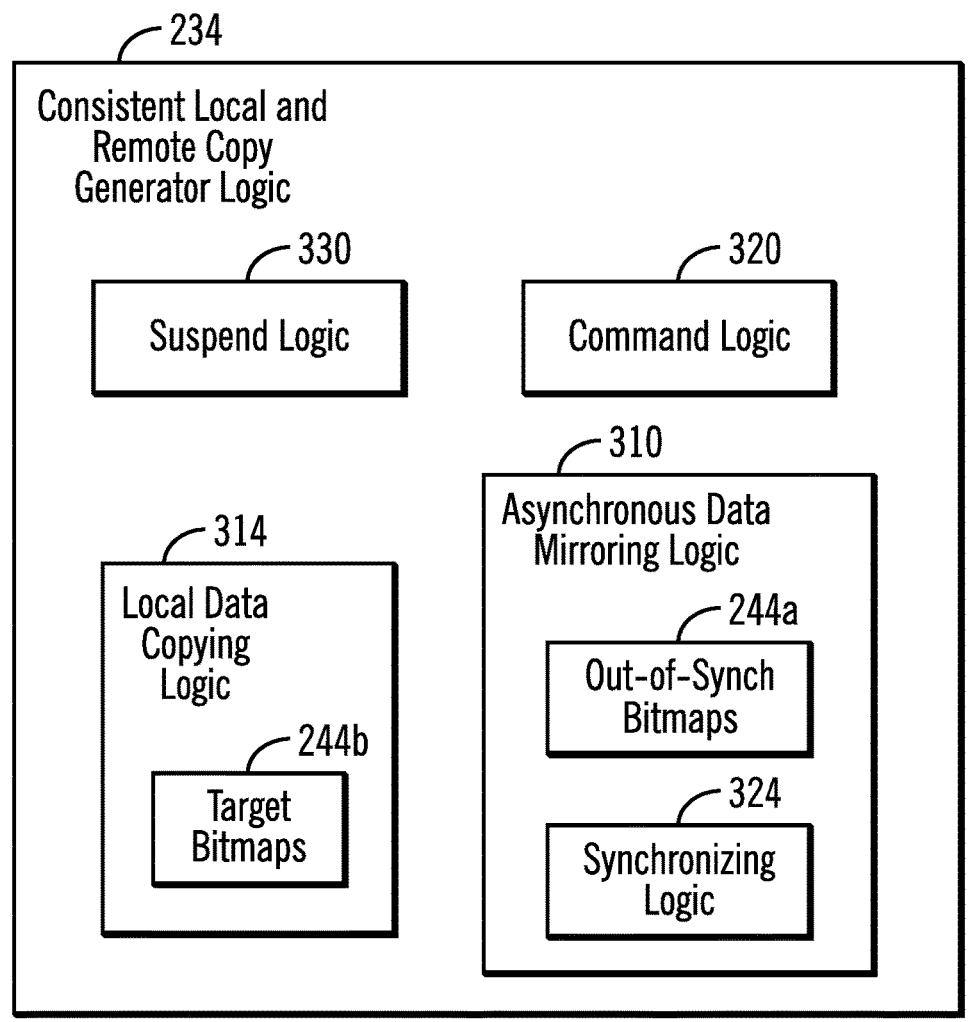
FIG. 4 illustrates an embodiment of consistent local and remote copy generator logic in accordance with one aspect of the present description.

Referring to FIGS. 1, 2, and 4 the storage controllers 4 (FIG. 1), 4a (FIG. 2), 4b each have a memory 230 (FIG. 1) that includes a storage manager 232 for managing storage operations including data replication operations from a primary volume1 of a primary system 24a to a secondary volume2 at a secondary system 24b. A consistent local and remote copy generator logic 234 of the storage manager 232 is configured to generate consistent copies such as point-in-time snap copies of the primary volume1 of primary system.

The pair of volumes, volume1, volume2 are in an asynchronous copy relationship such that updates to the primary volume1 are asynchronously mirrored to the secondary volume2. Thus, a first point-in-time snap copy may be made of the primary volume1 and a second point-in-time snap copy may be made consistent with the first point-in-time snap copy as of a particular point-in-time.

In the illustrated embodiment, the storage manager 232 including the consistent local and remote copy generator logic 234, is depicted as software stored in the memory 230 and executed by the CPU complex 12. However, it is appreciated that the logic functions of the storage manager 232 may be implemented as hardware, software, firmware or combinations of one or more thereof, depending upon the particular application.

One or more copy relationships 240, which may be maintained by the consistent local and remote copy generator logic 234 for the primary and secondary storage controllers 4a, 4b (FIG. 2) associate primary storage locations in the primary storage 10a and corresponding secondary storage locations in the secondary storage 10b, such that updates to the primary storage 10a locations are copied to the corresponding secondary storage 10b locations. For example, source storage locations in a primary storage volume1 (FIG. 2) of storage 10a may be mirrored in a mirror data replication operation to target storage locations of a secondary volume2 of the storage 10b pursuant to a mirror copy relationship 240 (FIG. 1).

In the illustrated embodiment, a copy relationship 240 comprises a peer-to-peer mirror relationship for a pair of storage locations in which updates to the primary (source) storage locations of the mirror relationship 240 are mirrored to the secondary (target) storage locations of the mirror relationship 240. It is appreciated that other types of copy relationships may be established, depending upon the particular application. For example, the copy relationships 240 may include point-in-time snap copy relationships.

In connection with a copy relationship 240 in an asynchronous data replication mode of the consistent local and remote copy generator logic 234, updates to the primary storage locations of the primary storage 10a may be indicated in a bitmap of a set of bitmaps 244, which is an out-of-sync (OOS) bitmap in the illustrated embodiment. Bits of the OOS bitmap are cleared as the storage manager 232 copies updates indicated in the OOS bitmap to the corresponding storage locations of the secondary storage 10b of secondary storage control unit 4b.

The storage manager 232 accesses updates to the primary storage 10a to write to the corresponding storage locations in the storage 10b. In some applications, the copying and relationship functions may be performed by devices external to the storage systems 24a, 24b (FIG. 2), such as the hosts, for example. In the illustrated embodiment, one copying relationship of the relationships 240 is a mirroring process in which each write update to the primary storage 10a is mirrored over to the secondary storage 10b. In the asynchronous mode of the illustrated embodiment, the I/O operation insofar as the host initiating the operation is concerned, is considered to be complete upon successful write of the update to the primary storage 10a. Accordingly, the host may be notified that the I/O operation was successfully completed notwithstanding that the update data has not yet been mirrored to the secondary storage 10b.

Periodically, volumes in a relationship 240 may be configured into a consistency group by consistency group logic 248 to ensure that a group of updates made to volumes at the primary system are also eventually made on the volumes of the consistency group to maintain data consistency as of a particular point in time or a particular set of data for those volumes of the group. Accordingly, additional updates to an OOS bit map may be stopped at a particular point in time to form a consistency group between volumes of the primary system and the secondary system. Any unprocessed updates as indicated by the OOS bit map are transferred to the secondary storage so that the volumes of the consistency group are consistent as of the point in time at which updates were no longer added to the OOS bit map.

In contrast to the asynchronous mode, in a synchronous mode, an I/O operation which performed a write operation to the primary storage 10a is not considered complete until the mirror operation is completed, that is, it is not complete until the update data has been successfully replicated to the secondary storage 10b. Should the mirror operation fail such that the update is not successfully mirrored to the storage 10b, the host may be notified that the update operation was not successfully completed.

The storage manager 232 in one embodiment may transfer data from the primary storage 10a to the secondary storage 10b in tracks. As used herein, the term track may refer to a track of a disk storage unit but may also reference to other units of data configured in the storage 10a, 10b, such as a bit, byte, word, segment, page, block (such as a Logical Block Address (LBA)), etc., which may be a part of a larger grouping of data units, such as a volume, logical device, etc.

In one embodiment, the storage devices 10a, 10b may be comprised of one or more sequential access storage devices, such as hard disk drives and magnetic tape or may include non-sequential access storage devices such as solid state drives (SSD), for example. Each storage device 10a, 10b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

One mode of the consistent local and remote copy generator logic 234 managing the copy relationships, may be implemented with asynchronous copy operations, such as a peer-to-peer remote copy (PPRC) program modified as appropriate in accordance with present description. An example of a PPRC program is the IBM Tivoli Productivity Center for Replication copy program that enables the switching of updates from the primary storage 10a to the secondary storage 10b. Suitable asynchronous mirroring programs include XRC (or zGM) modified as appropriate in accordance with present description. The described operations may be implemented with other programs such as other copy programs or other global recovery programs modified as appropriate in accordance with present description.

The system components 2a, 2b . . . 2n, 4, 4a, 4b, 10, 10a, 10b are connected to the network 6 which enables communication among these components. Thus, the network 6 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 2a, 2b, . . . 2n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 5A:
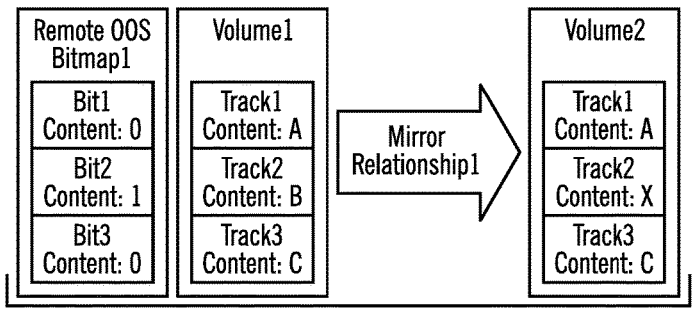
FIGS. 5a-5e depict examples of volumes, relationships and associated data structures in connection with of operations of the consistent local and remote copy generator logic of FIG. 4.

FIG. 4 depicts one embodiment of consistent local and remote copy generator logic 234 of the storage manager 232 (FIG. 1) which includes asynchronous data mirroring logic 310 configured to asynchronously mirror data from a first data unit such as a primary volume1 (FIG. 5a), for example, of a first storage unit such as the primary storage 10a (FIG. 2), for example, to a second data unit such as a secondary volume2 (FIG. 5a), for example, of a second storage unit such as the secondary storage 10b, for example. In the example of FIG. 5a, the asynchronous mirroring of data from the primary volume1 to the secondary volume2 is represented by an arrow labeled "mirror relationship1" in FIG. 5a. The data mirroring logic 310 of the consistent local and remote copy generator logic 234 in mirroring data from the first data unit to the second data unit, is further configured to generate a first out-of-synch (OOS) bitmap of bitmaps 244a such as the remote out-of-synch (OOS) bitmap1 (FIG. 5a) indicating remaining tracks to be mirrored from the primary volume1 to the secondary volume2.

For example, the remote OOS bitmap1 indicates by the bit state 0 of the bit1 of the bitmap1 that track1 of the primary volume1 has been successfully mirrored over to the secondary volume2. Thus, the content of track1 of the secondary volume2 as represented by the value "A" is the same as the content "A" of track1 of the primary volume1. Similarly, the remote OOS bitmap1 indicates by the bit state 0 of the bit3 of the bitmap1 that track3 of the primary volume1 has been successfully mirrored over to the secondary volume2. Thus, the content of track3 of the secondary volume2 as represented by the value "C" is the same as the content "C" of track3 of the primary volume1.

Conversely, the remote OOS bitmap1 indicates by the bit state 1 of the bit2 of the bitmap1 that track2 of the primary volume1 remains to be mirrored over to the secondary volume2. Thus, the content of track2 of the secondary volume2 as represented by the value "X" is not the same as the content "B" of track2 of the primary volume1.

Figure 5B:
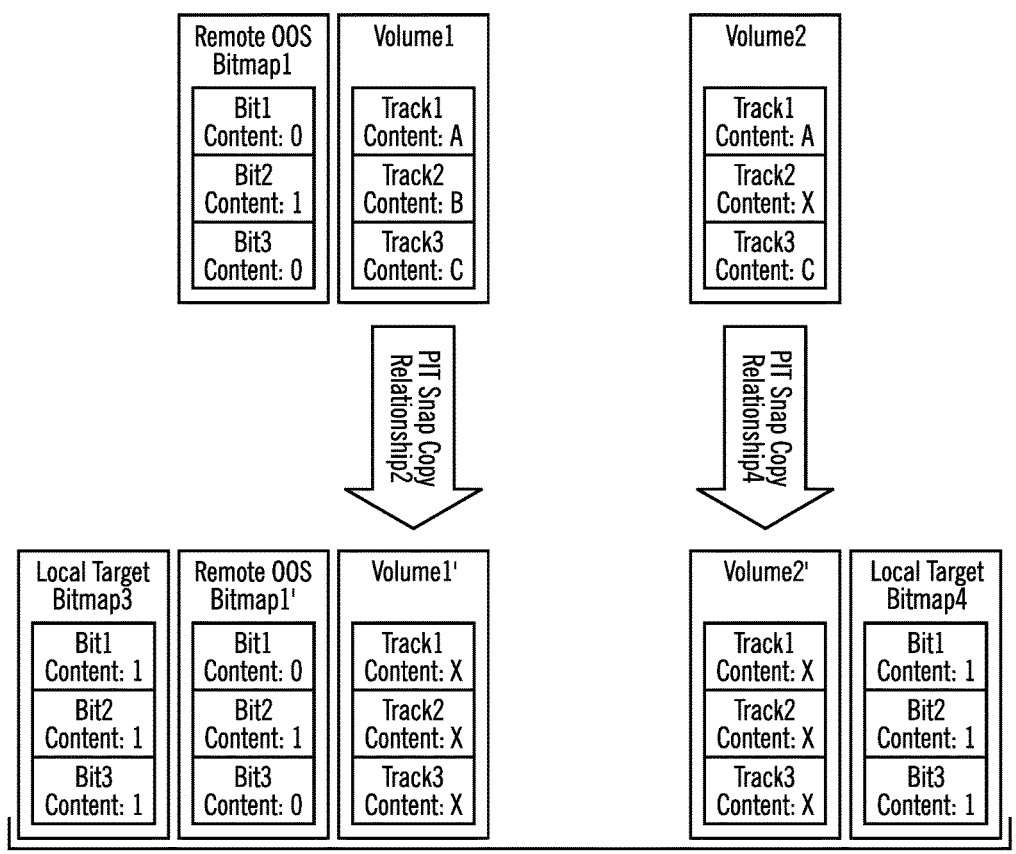

A local data copying logic 314 (FIG. 4) is configured to copy data of the primary volume1 (FIG. 5b) as of a first point-in-time to a third data unit such as the point-in-time snap copy volume1' of the primary system 24a (FIG. 2) to provide a first point-in-time snap copy of the primary volume1. In the example of FIG. 5b, the copy relationship between the primary volume1 and the point-in-time snap copy volume1' is represented by an arrow labeled point-in-time (PIT) snap copy relationship2.

In one embodiment, to provide the first point-in-time snap copy of the primary volume1 of the primary system 24a, a command logic 320 is configured to issue to the local data copying logic 314 a first point-in-time snap copy command to copy data of the primary volume1 as of the first point-in-time to the point-in-time snap copy volume1'. In response, the local data copying logic 314 is further configured to execute a first point-in-time snap copy command to copy data of the primary volume1 as of the first point-in-time to the point-in-time snap copy volume1' to provide the first point-in-time snap copy volume1'.

In one embodiment, the local data copying logic 314 is further configured to, in executing the first point-in-time snap copy command, generate a first target bitmap of bitmaps 244b such as the local target bitmap3 (FIG. 5b), for example, indicating tracks which have not been copied from the primary volume1 to the point-in-time snap copy volume1' as of the first point-in-time. For example, the local target bitmap3 indicates by the bit state 1 of the bit1 of the bitmap3 that track1 of the primary volume1 remains to be copied over to the point-in-time snap copy volume1'. Thus, the content of track1 of the point-in-time snap copy volume1' as represented by the value "X" is not the same as the content "A" of track1 of the primary volume1. The local target bitmap3 indicates by the bit state 1 of each of the remaining bits of the bitmap3 that each of the remaining tracks of the primary volume1 remain to be copied over to the point-in-time snap copy volume1' in the example of FIG. 5b.

In one embodiment, the point-in-time snap copy command which generates the point-in-time snap copy volume1' may be of a "no background copy" type in which the content of the primary volume1 need not be transferred to the point-in-time snap copy volume1' in a background copy operation. Instead, a read operation directed to a track of the point-in-time snap copy volume1' may be redirected to the corresponding track of the primary volume1 to obtain the content of that track if the local target bitmap3 indicates by a bit state 1 that the track has not been transferred to the point-in-time snap copy volume1'. However, should a track of the primary volume1 be targeted for an update, the content of that track will be transferred to the corresponding track of the point-in-time snap copy volume1' and the local target bitmap3 will be updated to indicate that the content of that track has been transferred. Accordingly, data for the volume1' to provide a consistent point-in-time snap copy of the data of the primary volume1 as of the first point-in-time may be obtained by data transfers within the primary system 24a.

It is appreciated that in other embodiments, the point-in-time snap copy command which generates the point-in-time snap copy volume1' may a "background copy" type in which the content of the primary volume1 is transferred in a background copy operation to the point-in-time snap copy volume1'. As the content of each track of the primary volume is transferred in a background copy to the content of the corresponding track of the point-in-time snap copy volume1', the bit state of the bit representing that track in the local target bitmap3 may be updated to a bit state value "0" to indicate that the track has been transferred to the point-in-time snap copy volume1'.

Thus, as used herein, the term "copying" includes actual copying in which data content of a source storage location is actually transferred to a target storage location. However, the term "copying" as used herein also includes virtual copying in which a data structure such as a bitmap is set to redirect read operations initially directed to a target storage location, to a source storage location instead of the target storage location, and thus need not include actual transfer of the data content of a source storage location to a target storage location. Similarly, as used herein, the term "copy" includes an actual copy in which a target storage location contains the same data content as a source storage location but also includes a virtual copy in which a target storage location has an associated data structure such as a target bitmap which has been set to redirect read operations initially directed to the target storage location, to the source storage location instead of the target storage location, such that a virtual copy need not include the actual data content of the source storage location.

The command logic 320 (FIG. 4) of the consistent local and remote copy generator logic 234 is further configured to issue a command to the secondary system 24b (FIG. 2) to copy data of the secondary volume2 (FIG. 5b) as of a second point-in-time to a fourth data unit such as volume2', for example, of the secondary system 24b to provide a point-in-time snap copy volume2' of the secondary volume2. In the example of FIG. 5b, the copy relationship between the second volume2 and the point-in-time snap copy volume2' is represented by an arrow labeled point-in-time (PIT) snap copy relationship4.

In one embodiment, to provide the point-in-time snap copy of the secondary volume2 of the secondary system 24b, the command logic 320, is further configured to issue a point-in-time snap copy command to the secondary system 24b to generate a second target bitmap such as the local target bitmap4, for example, of the secondary system 24b, indicating tracks which have not been copied from the secondary volume2 to the second point-in-time snap copy volume2'. For example, the local target bitmap4 indicates by the bit state 1 of the bit1 of the bitmap4 that track1 of the secondary volume2 remains to be copied over to the point-in-time snap copy volume2'. Thus, the content of track1 of the point-in-time snap copy volume2' as represented by the value "X" is not the same as the content "A" of track1 of the secondary volume2. The local target bitmap4 indicates by the bit state 1 of each of the remaining bits of the bitmap4 that each of the remaining tracks of the secondary volume2 remain to be copied over to the point-in-time snap copy volume2' in the example of FIG. 5b.

In one embodiment, the point-in-time snap copy command which generates the point-in-time snap copy volume2' may be of a "background copy" type in which the content of the secondary volume2 is transferred to the point-in-time snap copy volume2' in a background copy operation. Thus, as the content of each track of the secondary volume2 is transferred to the content of the corresponding track of the point-in-time snap copy volume2', the bit state of the bit representing that track in the local target bitmap4 may be updated to a bit state value "0" to indicate that the track has been transferred to the point-in-time snap copy volume1'. It is appreciated that in other embodiments, the point-in-time snap copy command which generates the point-in-time snap copy volume2' may be of a "no background copy" type in which the content of the secondary volume2 is not transferred to the point-in-time snap copy volume2' in a background copy operation.

In one aspect of the present description, it is appreciated that data for the second point-in-time snap copy volume2' already resides on the secondary system 24b due to the mirroring operation as represented by the mirror relationship1 (FIG. 5a). As a result, in many applications most of the data for the second point-in-time snap copy volume2' may be copied within the secondary system 24b and obviating much of any copying of data over a network from the primary system 24a to provide the second point-in-time snap copy volume2'. For example, in response to the command logic 320 issuing a point-in-time snap copy command to the secondary system 24b, the local data copying logic 314 of the secondary storage controller 4b, is further configured to command the secondary system to background copy tracks of the secondary volume2 to the point-in-time snap copy volume2' if the local target bitmap4 indicates data tracks remain to be copied from the secondary volume2 to the point-in-time snap copy volume2'. Accordingly, data for the volume2' to provide a consistent point-in-time snap copy of the data of the primary volume1 as of the first point-in-time may be obtained primarily by data transfers within the secondary system 24b.

However, it is further appreciated that because the mirror relationship1 (FIG. 5a) of this embodiment is an asynchronous relationship, in some instances not all of the data for the second point-in-time snap copy volume2' may be found on the secondary system 24b. Accordingly, in another aspect of the present description, the data mirroring logic 310 of the consistent local and remote copy generator logic 234 includes synchronizing logic 324 (FIG. 4) configured to synchronize data of the second point-in-time snap copy volume 2' of the secondary system 24b as of the first point-in-time to the first point-in-time snap copy volume1' of the primary system 24a. In this manner, additional data for the second point-in-time snap copy volume 2' of the secondary system 24b to complete a second point-in-time snap copy volume 2' of the secondary system 24b so that it will be consistent as of the first point-in-time, may be obtained by copying selected data from the first point-in-time snap copy volume1' of the primary system 24a. For example, in one embodiment, the synchronizing operation includes copying selected data from the first point-in-time snap copy volume1' of the primary system 24a over the network 6 to the second point-in-time snap copy volume2' of the secondary system 24b so that both the first and second point-in-time snap copy volumes, volume1' and volume2', provide consistent point-in-time snap copies of the data of the primary volume1 of the primary system 24a as of the first point-in-time. Since most of the data needed for the point-in-time snap copy volume 2' of the secondary system may already reside on the secondary system 24b, much of the copying of data over a network from the primary system to the secondary system may be obviated when generating consistent point-in-time snap copy volumes of the primary and secondary systems, respectively.

To facilitate generating point-in-time snap copy volumes, volume1' and volume2', which are consistent with each other, the consistent local and remote copy generator logic 234 of the primary storage controller 4a further includes in one embodiment, suspend logic 330 configured to quiesce host input to the primary volume1. After quiescing host input to the primary volume1, mirroring of data from the primary volume1 to the secondary volume2 may be idled. The idling of mirroring of data from the primary volume1 to the secondary volume2 is represented by the omission in FIG. 5b of the arrow labeled "mirror relationship1" previously depicted in FIG. 5a.

In another aspect, the synchronizing logic 324 of the data mirroring logic 310 is further configured to copy the remote OOS (out-of-synch) bitmap1, FIG. 5b, (as of the first point-in-time) to a second out-of-synch bitmap, that is the remote OOS bitmap1' to indicate remaining tracks to be mirrored from the point-in-time snap copy volume1' of the primary system 24a to the point-in-time snap copy volume2' of the secondary system 24b. Still further, the suspend logic 330 of the consistent local and remote copy generator logic 234 is further configured to unquiesce host input to the first data unit, and to restart mirroring and thus resynchronization of data from the primary volume1 to the secondary volume2 as indicated by the arrow labeled "mirror relationship1" of FIG. 5c.

In one embodiment, all the bits of the local target bitmap4 may be initially set to "1" to indicate that all tracks are to be copied from the secondary volume2 to the point-in-time snap copy volume2'. In another embodiment, the command logic may transmit to the secondary system 24*b* a bitmap which is an inverted version of the remote out-of-synch bitmap1' for use as the local target bitmap4. Hence, in the inverted version, the content"0" of bit1 of the bitmap1' will be inverted to "1" and stored in bit1 of the bitmap4. Conversely, the content "1" of bit2 of the bitmap1' will be inverted to "0" and stored in bit2 of the bitmap4. As consequence, any tracks which are to be mirrored from the primary system 24*a* to the point-in-time snap copy volume2' of the system 24*b*, need not be transferred from the secondary volume2 to the point-in-time snap copy volume2'. Conversely, any tracks which are transferred from the secondary volume2 to the point-in-time snap copy volume2' need not be mirrored from the primary system 24*a* to the point-in-time snap copy volume2' of the system 24*b*.

Figure 5C:
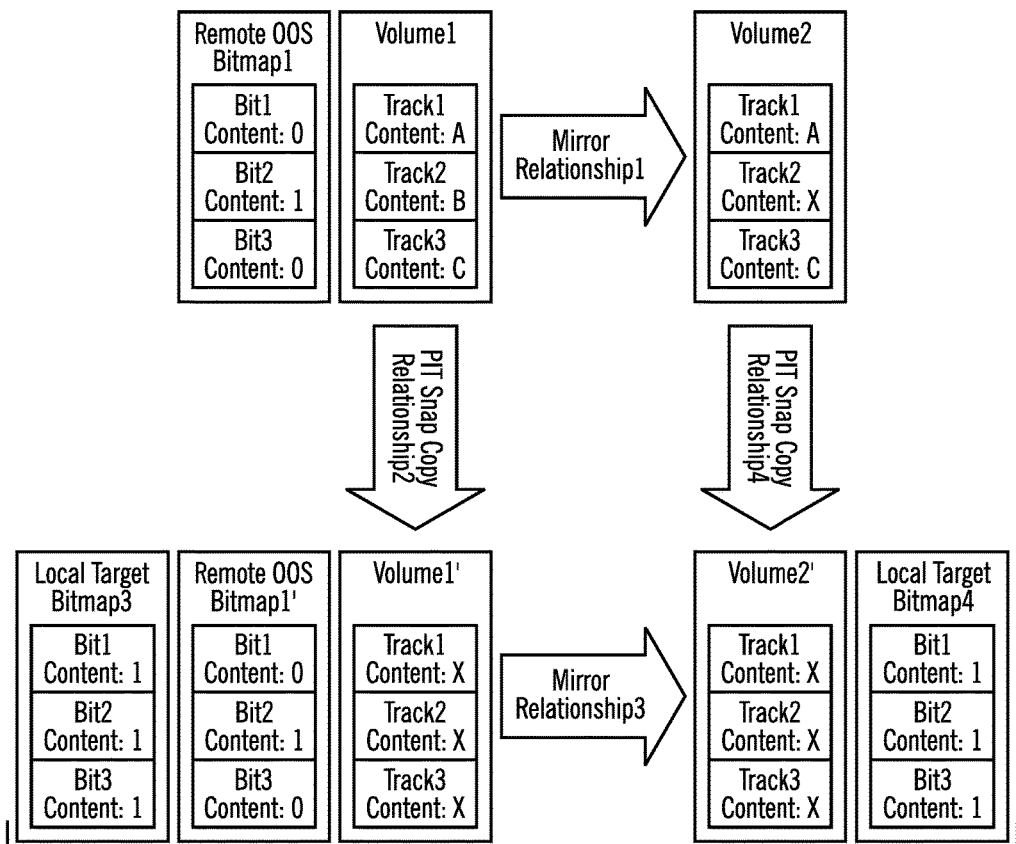

The synchronizing logic 324 of the data mirroring logic 310 in copying selected data from the point-in-time snap copy volume1' to the point-in-time snap copy volume2' to synchronize the data of the point-in-time snap copy volume2' to selected data of the point-in-time snap copy volume1' as of the first point-in-time, is further configured to process the second remote out-of-synch bitmap1' and mirror tracks from the point-in-time snap copy volume1' to the point-in-time snap copy volume2' if indicated as remaining to be copied from the point-in-time snap copy volume1' to the point-in-time snap copy volume2'. In the example of FIG. 5*c*, the asynchronous mirroring of data from the point-in-time snap copy volume1' to the point-in-time snap copy volume2' is represented by an arrow labeled "mirror relationship3" in FIG. 5*c*. In this manner, additional data for the second point-in-time snap copy volume 2' of the secondary system 24*b* to complete the second point-in-time snap copy volume 2' of the secondary system 24*b* so that it will be consistent as of the first point-in-time, may be obtained by copying selected data from the first point-in-time snap copy volume1' of the primary system 24*a* utilizing the asynchronous mirroring of data from the point-in-time snap copy volume1' to the point-in-time snap copy volume2' as represented by the arrow labeled "mirror relationship3" in FIG. 5*c*.

However, it is appreciated that the content of a track to be mirrored from the point-in-time snap copy volume1' to the point-in-time snap copy volume2' may not have been copied from the primary volume1 to the point-in-time snap copy volume1'. For example, FIG. 5*c* depicts the content of track2 of the primary volume1 as having the content "B" whereas the content of the corresponding track2 of the point-in-time snap copy volume1' has the content "X" indicating it is not the same content as the content "B" of track2 of the primary volume1. Accordingly, bit2 of the local target bitmap3 of FIG. 5*b* has a bit state of "1" indicating that the content of track2 of the primary volume1 has not been transferred to the content of the corresponding track2 of the point-in-time snap copy volume1'.

Figure 5D:
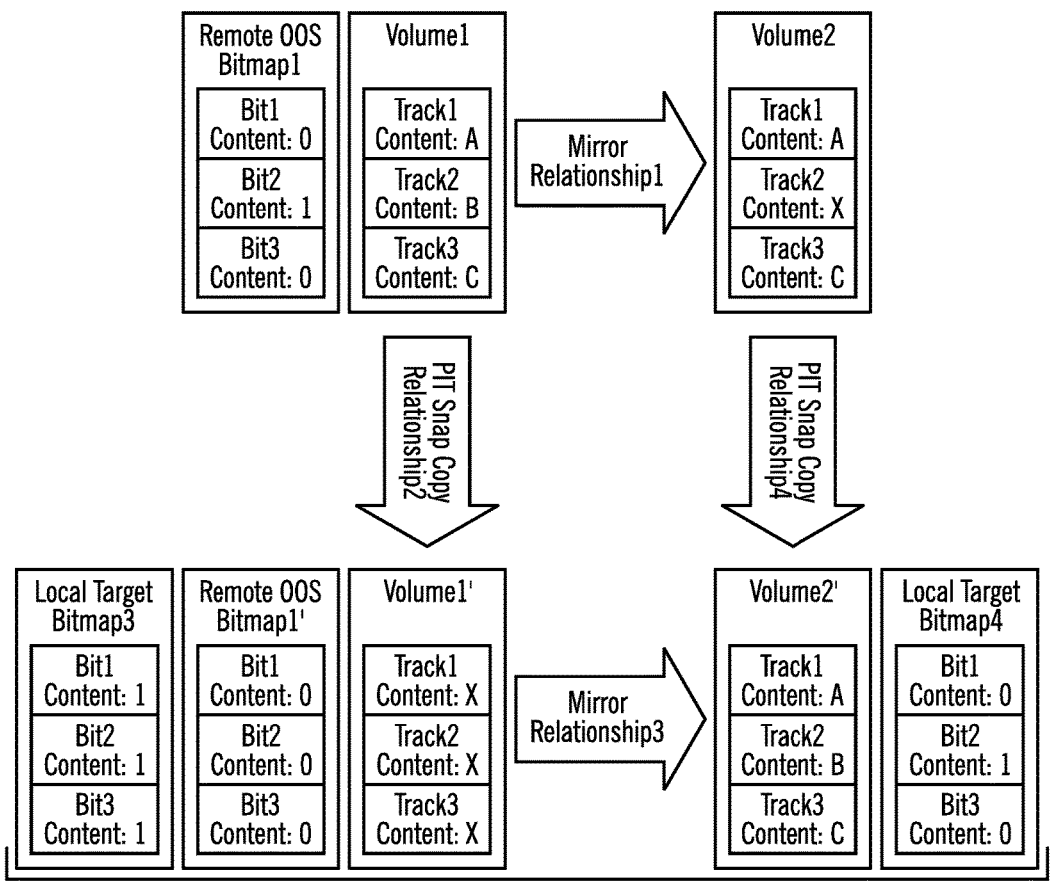

Since the content of a track to be mirrored from the point-in-time snap copy volume1' to the point-in-time snap copy volume2' may not have been transferred from the primary volume1 to the point-in-time snap copy volume1' as indicated by the local target bitmap3, the synchronizing logic 324 of the data mirroring logic 310 in copying selected data from the point-in-time snap copy volume1' to the point-in-time snap copy volume2' to synchronize the data of the point-in-time snap copy volume2' to the point-in-time snap copy volume1' as of the first point-in-time, is further configured to obtain data for a data track of the point-in-time snap copy volume2' from the primary volume1 and mirror the data to the point-in-time snap copy volume2' if the local target bitmap3 indicates that the data track has not been transferred from the primary volume1 to the point-in-time snap copy volume1'. For example, a read operation directed to track2 of the point-in-time snap copy volume1' may be redirected to track2 of the primary volume1 as indicated by the bit state "1" of bit2 of the local target bitmap3 in which bit2 corresponds to track2 of the point-in-time snap copy volume1'. Having obtained the content "B" of track2 of the primary volume1 in a redirected read operation, FIG. 5*d* depicts the content "B" of track2 of the primary volume1 as having been mirrored to the corresponding track2 of the point-in-time snap copy volume2'. In addition, bit2 of the remote out-of-synch bitmap1' in which bit2 corresponds to track2 of the point-in-time snap copy volume1', may be updated to have a bit state value "0" to indicate that the content of track2 has been mirrored to the point-in-time snap copy volume2' as shown in FIG. 5*d*.

In one embodiment, the content of track2 of the point-in-time snap copy volume1' may also receive the content "B" from track2 of the primary volume1. If so, bit2 of the local target bitmap3 in which bit2 corresponds to track2 of the point-in-time snap copy volume1', may be updated to have a bit state value "0" to indicate that the content of track2 has been transferred from the primary volume1 to the point-in-time snap copy volume1'.

In this manner, once the content "B" of track2 of the primary volume1 has been obtained, the content "B" of track2 may be mirrored over to the corresponding track2 of the point-in-time snap copy volume2' as shown in FIG. 5*d*. However, as noted above, it is appreciated that in many applications, most of the data to form the point-in-time snap copy volume2' of the secondary system 24*b* already resides on the secondary system 24*b* due to the mirror relationship1. Accordingly, data may be copied from the secondary volume2 to the point-in-time snap copy volume2' pursuant to the point-in-time snap copy relationship4 which is a background copy type relationship in the embodiment of FIG. 5*d*.

For example, FIG. 5*d* depicts the content "A" of track1 of the secondary volume2 as having been transferred to the corresponding track1 of the point-in-time snap copy volume2'. Accordingly, bit1 of the local target bitmap4 of FIG. 5*d* is updated to have a bit state of "0" indicating that the content of track1 of the secondary volume2 has been transferred to the content of the corresponding track1 of the point-in-time snap copy volume2'. Similarly, FIG. 5*d* depicts the content "C" of track3 of the secondary volume2 as having been transferred to the corresponding track3 of the point-in-time snap copy volume2'. Accordingly, bit3 of the local target bitmap4 of FIG. 5*d* is updated to have a bit state of "0" indicating that the content of track3 of the secondary volume2 has been transferred to the content of the corresponding track3 of the point-in-time snap copy volume2'. In this manner, target and out-of-synch bitmaps may be used in combination to synchronize volumes of the primary system and the secondary system to provide consistent point-in-time snap copies of the data of a primary volume as of the first point-in-time while reducing the amount of data transferred over a network between the primary system and the secondary system.

It is noted that there are various sequences and paths in which data may be transferred to the point-in-time snap copy volume2'. For example, the content "X" of track2 of the secondary volume2 may be transferred by the relationship4 down to track2 of the volume2' before the mirror relationship3 mirrors the content "B" from track2 of the primary volume1 to track2 of the volume2'. If so, the mirror relationship3 overwrites the content "X" with the content "B" from track2 of the primary volume1 as depicted in FIG. 5d. The initial transfer of the content "X" of track2 of the secondary volume2 by the relationship4 down to track2 of the volume2' causes the corresponding bit2 of the local target bitmap4 to be updated to indicate that the content of track2 of the secondary volume2 has been transferred to track2 of the point-in-time snap copy volume2', thereby preventing further overwrites of content from the secondary volume2 to track2 of the point-in-time snap copy volume2' upon subsequent updates of track2 of the secondary volume2.

As another example, the content "B" of track2 of the primary volume1 may be mirrored by the relationship1 to track2 of the secondary volume2 before the mirror relationship3 mirrors the content "B" from track2 of the primary volume1 to track2 of the volume2'. Since the volume2' is based upon a point-in-time snap copy of the secondary volume2, any updates to the secondary volume2 after the snapshot of the secondary volume2, causes the original content of the track to be updated to be first transferred to the point-in-time snap copy volume2' before the content of the track of the secondary volume2 is updated. Accordingly, an update to track2 of the secondary volume2 with the content "B" by the mirror relationship1, causes the original content "X" of track2 of the secondary volume2 to be transferred by the relationship4 down to track2 of the volume2' before the content "B" overwrites the content of track2 of the secondary volume2. Subsequently, the mirror relationship3 overwrites the content "X" of track2 of the point-in-time snap copy volume2' with the content "B" from track2 of the primary volume1, again providing the result depicted in FIG. 5d. The initial transfer of the content "X" of track2 of the secondary volume2 by the relationship4 down to track2 of the volume2' causes the corresponding bit2 of the local target bitmap4 to be updated to indicate that the content of track2 of the secondary volume2 has been transferred to track2 of the point-in-time snap copy volume2', thereby preventing further overwrites of content from the secondary volume2 to track2 of the point-in-time snap copy volume2' upon subsequent updates of track2 of the secondary volume2.

In another aspect of the present description, once the input/output operations are unquiesced as discussed above, any updates to the point-in-time snap copy volume1' will be mirrored by the relationship3 to the point-in-time snap copy volume2'. In this manner, the point-in-time snap copy volume1' and volume2' will remain consistent and synchronized notwithstanding updates to the volume1' of the primary system.

In the event that a track of the primary volume1 is also updated before the mirror relationship3 mirrors the content of that track to the point-in-time snap copy volume2', the original content of the track at the time of the creation of the point-in-time snap copy volume1' will be transferred to the corresponding track of the point-in-time snap copy volume1' to preserve the original content for subsequent mirroring by the mirror relationship3 to the point-in-time snap copy volume2'. For example, in the event that track2 of the primary volume1 is updated before the mirror relationship3 mirrors the content "B" of track2 of the primary volume1 to track2 of the point-in-time snap copy volume2', the original content "B" of track2 of the primary volume1 at the time of the creation of the point-in-time snap copy volume1' will be transferred to the corresponding track2 of the point-in-time snap copy volume1' to preserve the original content "B" of that track for subsequent mirroring by the mirror relationship3 of the content "B" of track2 of the primary volume1 to track2 of the point-in-time snap copy volume2'. The corresponding bit of the local target bitmap3 will be updated to indicate that the original content of the primary volume1 for the track has been transferred to the corresponding track of the point-in-time snap copy volume1'.

As another example, the content "A" of track1 of the primary volume may be updated with new contents which are mirrored over by relationship1 to the corresponding track1 of the secondary volume2 before the content "A" of track1 the secondary volume2 is transferred by the relationship4 to the corresponding track1 of the point-in-time snap copy volume2'. However, since the volume2' is based upon a point-in-time snap copy of the secondary volume2, any updates to the secondary volume2 after the snapshot of the secondary volume2, causes the original content of the track to be updated to be first transferred to the point-in-time snap copy volume2' before the contents of the track of the secondary volume2 are updated. Accordingly, an update to track1 of the secondary volume2 with the new content to replace content "A", causes the original content "A" of track1 of the secondary volume2 to be transferred by the relationship4 down to track1 of the volume2' before the new content overwrites the content "A" of track1 of the secondary volume2. The transfer of the content "A" of track1 of the secondary volume2 by the relationship4 down to track1 of the volume2' causes the corresponding bit1 of the local target bitmap4 to be updated to indicate that the content of track1 of the secondary volume2 has been transferred to track1 of the point-in-time snap copy volume2', thereby preventing further overwrites of content from the secondary volume2 to track1 of the point-in-time snap copy volume2' upon subsequent updates of track1 of the secondary volume2.

Figure 5E:
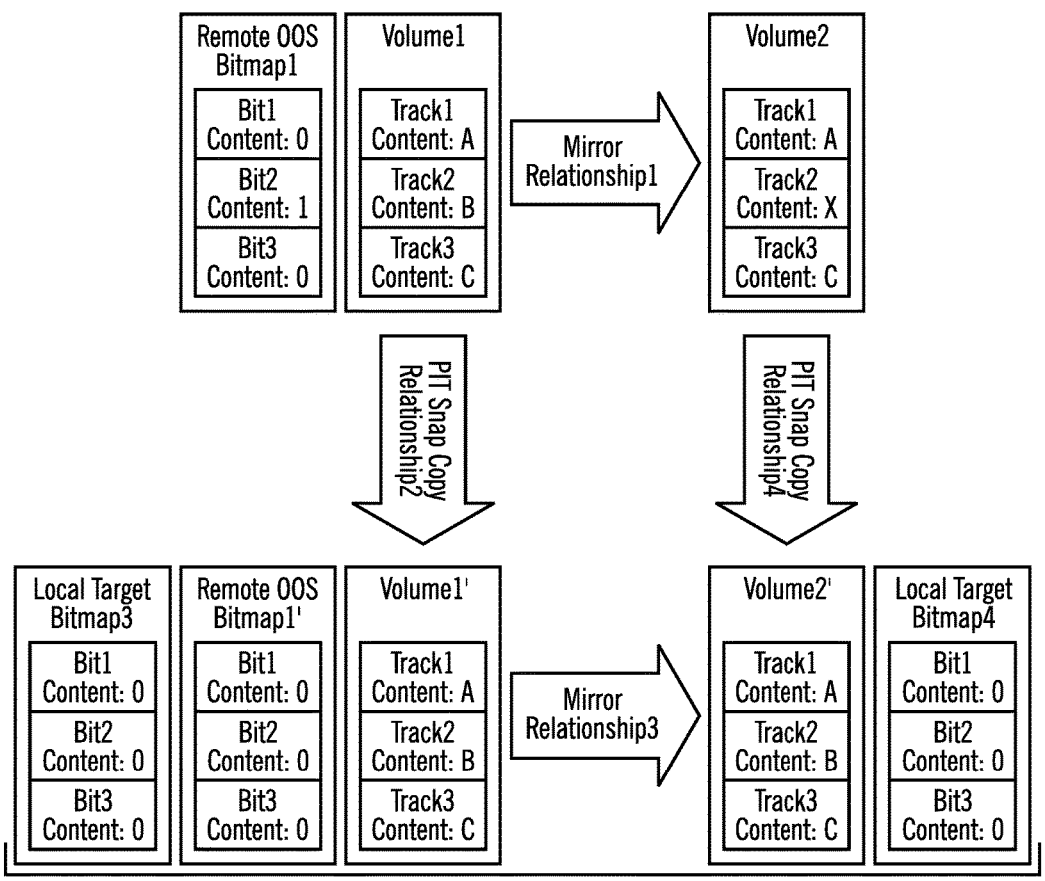

FIG. 5e is directed to an embodiment in which the point-in-time snap copy relationship2 is a background copy type. Accordingly, the content "B" of track2 of the primary volume1 may be transferred to the point-in-time snap copy volume1' and bit2 of the local target bitmap3 of FIG. 5c may be updated to have a bit state of "0" indicating that the content of track2 of the primary volume1 has been copied to the content of the corresponding track2 of the point-in-time snap copy volume1'. In a similar manner, the content of the remaining tracks of the primary volume1 may be transferred in a background copy operation to the point-in-time snap copy volume1' and the corresponding bits of the local target bitmap3 of FIG. 5c may be updated to have a bit state of "0" indicating that the content of those tracks of the primary volume1 have been transferred to the content of the corresponding tracks of the point-in-time snap copy volume1'.

Once all bits of the local target bitmap4 have been processed transferring content from the secondary volume2 to the point-in-time snap copy volume2', and the bits of the remote out-of-synch bitmap1' have been processed, mirroring the content of the associated tracks to the point-in-time snap copy volume2', the point-in-time snap copy volume2' will have a complete set of data consistent with the point-in-time snap copy volume1' of the primary volume1 as of the first point-in-time. In addition, the primary volume1 and the point-in-time snap copy volume1' will form a consistency group as of the first point-in-time. Thus, the volumes in a relationship3 may be configured into a consistency group by consistency group logic 248 to maintain data consistency as of a particular point in time or a particular set of data for those volumes of the group. Accordingly, additional updates to an OOS bitmap1' may be stopped at a particular point in time to form a consistency group between volume1' of the primary system and the volume2' of the secondary system. Any unprocessed updates as indicated by the OOS bitmap1' are transferred to the secondary storage so that the volumes of the consistency group are consistent as of the point in time at which updates were no longer added to the OOS bitmap1'.

In another aspect, in the event that the point-in-time copy functions of the point-in-time copy relationship4 fails, the point-in-time snap copy volume2' may be formed by setting all bits of the remote out-of-synch bitmap1' to indicate that all tracks should be mirrored to the point-in-time snap copy volume2' from the primary system 24a.

Figure 6:
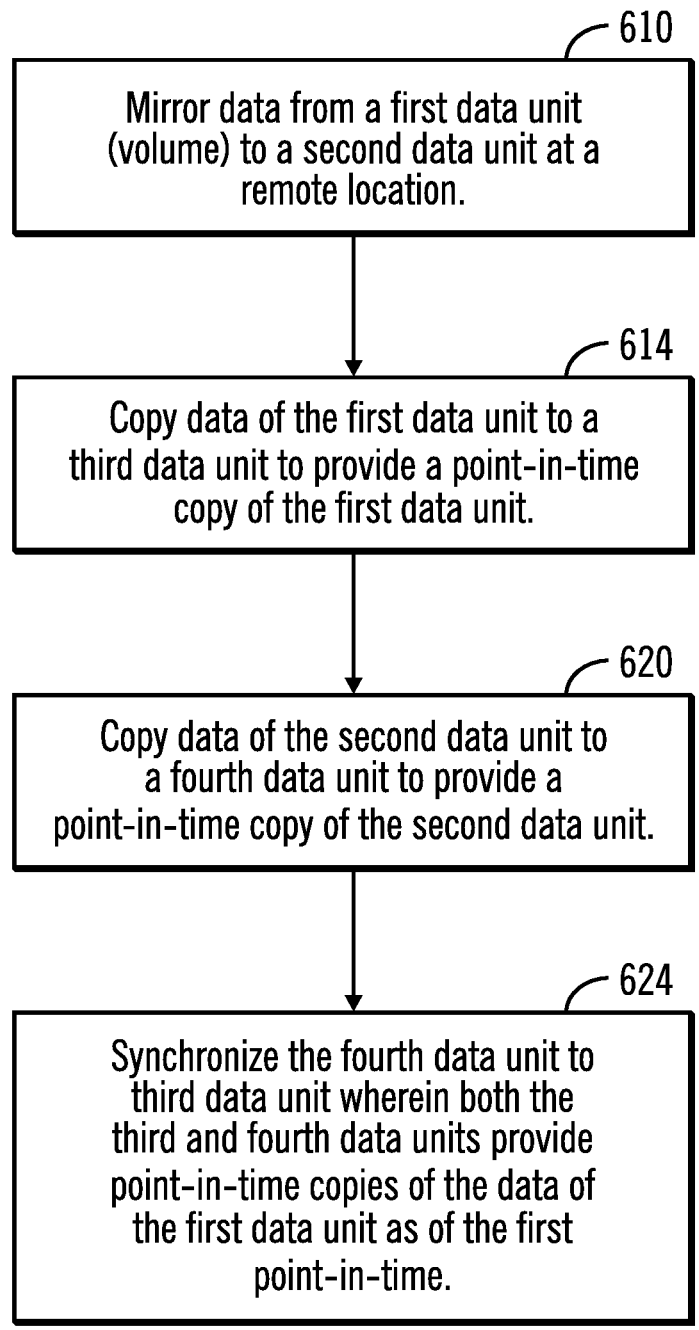
FIG. 6 depicts an example of operations of the consistent local and remote copy generator logic of FIG. 4.

FIG. 6 depicts one example of operations of the storage manager 232 (FIG. 1) including the consistent local and remote copy generator logic 234 (FIG. 4). In one operation, data is mirrored (block 610) from a first data unit such as the primary volume1 (FIG. 2), for example, to a second data unit such as the secondary volume2. FIG. 5a shows an example of asynchronous mirroring of data from the primary volume1 to the secondary volume2 as represented by an arrow labeled "mirror relationship1" in FIG. 5a.

Referring to both FIGS. 4 and 6 unless otherwise noted, the consistent local and remote copy generator logic 234 of the storage manager 232 (FIG. 1) copies (block 614) data of the first data unit to a third data unit to provide a point-in-time snap copy of the first data unit. For example, local data copying logic 314 copies data of the primary volume1 (FIG. 5b) as of a first point-in-time to a third data unit such as the point-in-time snap copy volume1' of the primary system 24a to provide a first point-in-time snap copy of the primary volume1. In the example of FIG. 5b, the copy relationship between the primary volume1 and the point-in-time snap copy volume1' is represented by an arrow labeled point-in-time (PIT) copy relationship2. As previously mentioned, the point-in-time (PIT) copy relationship2 may be a background copy type or a no background copy type, depending upon the particular application.

In another operation, data of the second data unit (such as the secondary volume2) is copied (block 620) to a fourth data unit to provide a point-in-time snap copy of the second data unit. For example, local data copying logic 314 of the secondary system 24b copies data of the secondary volume2 (FIG. 5b) as of a first point-in-time to a fourth data unit such as the point-in-time snap copy volume1' of the primary system 24a to provide a point-in-time snap copy of the secondary volume2. In the example of FIG. 5b, the copy relationship between the secondary volume2 and the point-in-time snap copy volume2' is represented by an arrow labeled point-in-time (PIT) copy relationship4. It is appreciated that in many applications most of the data for the second point-in-time snap copy volume2' may be copied within the secondary system 24b, thereby obviating much of any copying of data over a network from the primary system 24a to provide the second point-in-time snap copy volume2'. As previously mentioned, the point-in-time (PIT) copy relationship4 may be a background copy type or a no background copy type, depending upon the particular application.

In another operation, the fourth data unit (such as the point-in-time snap copy volume2') may be synchronized (block 624) to the third data unit (such as point-in-time snap copy volume1') wherein both the third and fourth data units provide point-in-time snap copies of the data of the first data unit (such as primary volume1) as of the first point-in-time. As noted above, it is further appreciated that because the mirror relationship1 (FIG. 5a) of this embodiment is an asynchronous relationship, in some instances not all of the data for the second point-in-time snap copy volume2' may be found on the secondary system 24b. Accordingly, in another aspect of the present description, the data mirroring logic 310 of the consistent local and remote copy generator logic 234 includes synchronizing logic 324 to synchronize data of the second point-in-time snap copy volume 2' of the secondary system 24b as of the first point-in-time to the first point-in-time snap copy volume1' of the primary system 24a. In this manner, additional data for the second point-in-time snap copy volume 2' of the secondary system 24b to complete a second point-in-time snap copy volume 2' of the secondary system 24b so that it will be consistent as of the first point-in-time, may be obtained by copying selected data from the primary system 24a. For example, in one embodiment, the synchronizing operation includes copying selected data from the first point-in-time snap copy volume1' (or from the primary volume1 if not present on the first point-in-time snap copy volume1') of the primary system 24a over the network 6 to the second point-in-time snap copy volume2' of the secondary system 24b so that both the first and second point-in-time snap copy volumes, volume1' and volume2', provide consistent point-in-time snap copies of the data of the primary volume1 of the primary system 24a as of the first point-in-time. Since most of the data needed for the point-in-time snap copy volume 2' of the secondary system may already reside on the secondary system 24b, much of the copying of data over a network from the primary system to the secondary system may be obviated when generating consistent point-in-time snap copy volumes located at the primary and secondary systems, respectively.

Figure 7:
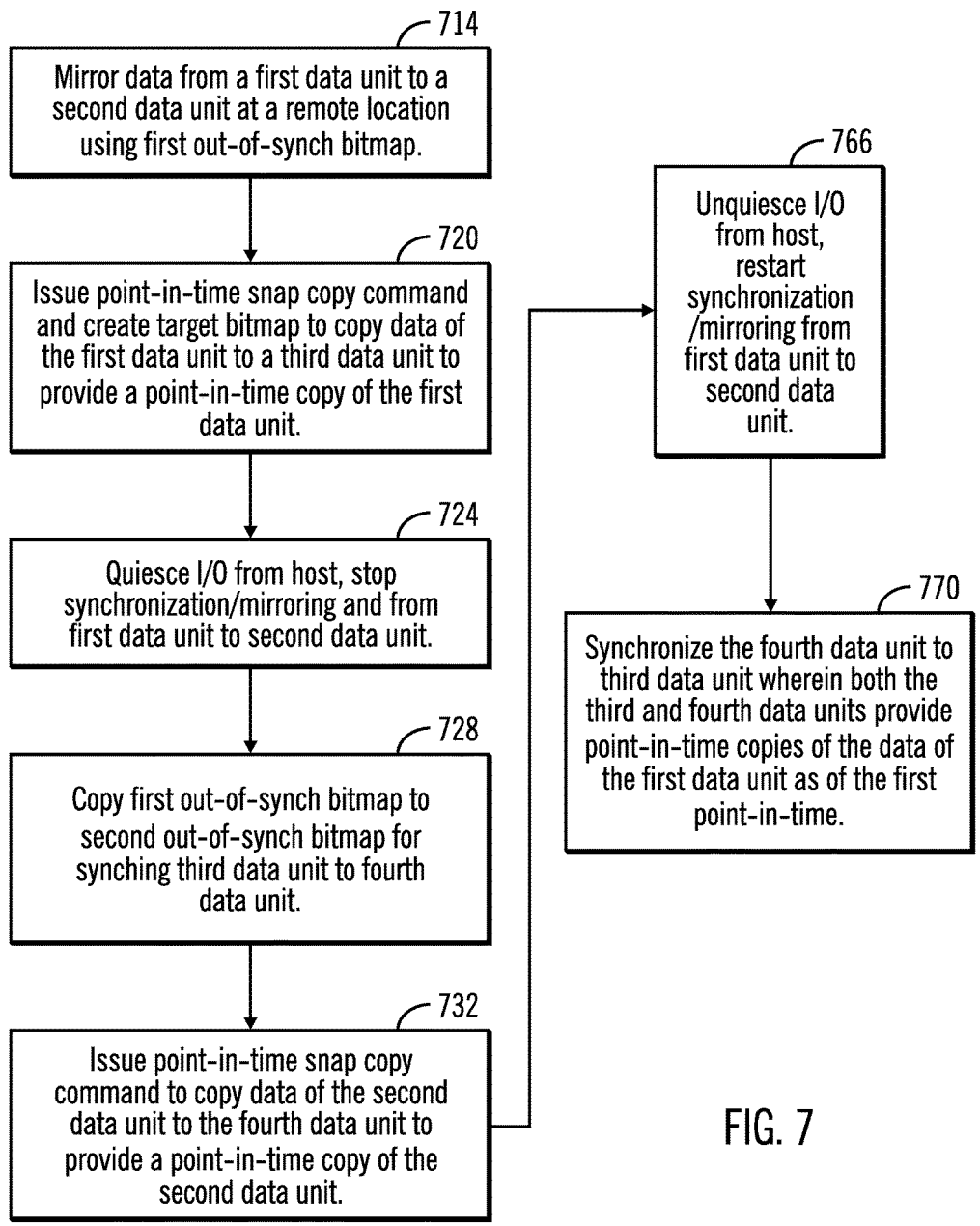
FIG. 7 depicts another example of operations of the consistent local and remote copy generator logic of FIG. 4.

FIG. 7 provides a more detailed example of operations of the storage manager 232 (FIG. 1) including the consistent local and remote copy generator logic 234 (FIG. 4). Referring to both FIGS. 4 and 7 unless otherwise noted, in one operation, data is mirrored (block 714) from a first data unit (primary volume1) to a second data unit (secondary volume2) at a remote location using a first out-of-synch bitmap. FIG. 5a shows an example of asynchronous mirroring of data from the primary volume1 to the secondary volume2 as represented by an arrow labeled "mirror relationship1" in FIG. 5a, utilizing the remote out-of-synch bitmap1.

In another operation, a point-in-time snap copy command is issued (block 720) which creates a target bitmap to copy data of the first data unit to a third data unit to provide a point-in-time snap copy of the first data unit. For example, the command logic 320 issues to the local data copying logic 314 a first point-in-time snap copy command to copy data of the primary volume1 as of the first point-in-time to the point-in-time snap copy volume1'. In response, the local data copying logic 314 "copies" data of the primary volume1 as of the first point-in-time to the point-in-time snap copy volume1' to provide the first point-in-time snap copy volume1'. In the example of FIG. 5b, the copy relationship between the primary volume1 and the point-in-time snap copy volume1' is represented by an arrow labeled point-in-time (PIT) copy relationship2.

As previously mentioned, in one embodiment, in generating the point-in-time snap copy volume1', the content of the primary volume1 need not be transferred to the point-in-time snap copy volume1' in a background copy operation. Instead, the local data copying logic 314 generates a first target bitmap such as the local target bitmap3, for example, indicating tracks which have not been copied from the primary volume1 to the point-in-time snap copy volume1' as of the first point-in-time. As a result, read operations directed to a track of the point-in-time snap copy volume1' are redirected by the local target bitmap3 to the primary volume1 where the content of the referenced track may be obtained. It is appreciated that in other embodiments, the contents of the point-in-time snap copy volume1' may be filled in a background copy operation utilizing the local target bitmap3 to transfer content to the primary volume1.

In another operation, input/output operations from a host to the primary volume1 are quiesced (block 724) and mirroring operations from the first data unit (primary volume1) to the second data unit (secondary volume2) are suspended (block 724) to suspend synchronization of the first data unit (primary volume1) to the second data unit (secondary volume2). For example, suspend logic 330 quiesces host input to the primary volume1, and idles mirroring of data from the primary volume1 to the secondary volume2. The idling of mirroring of data from the primary volume1 to the secondary volume2 is represented by the omission in FIG. 5b of the arrow labeled "mirror relationship1" previously depicted in FIG. 5a.

The first out-of-synch bitmap is copied (block 728) to a second out-of-synch bitmap for synching the third data unit to the fourth data unit. For example, the synchronizing logic 324 of the data mirroring logic 310 copies the remote OOS (out-of-synch) bitmap1, FIG. 5b, (as of the first point-in-time) to a second out-of-synch bitmap, that is the remote OOS bitmap1' to indicate remaining tracks to be mirrored from the point-in-time snap copy volume1' of the primary system 24a to the point-in-time snap copy volume2' of the secondary system 24b.

Another point-in-time snap copy command is issued (block 732) to copy data of the second data unit to the fourth data unit to provide a point-in-time snap copy of the second data unit. For example, command logic 320 (FIG. 4) of the consistent local and remote copy generator logic 234 of the primary system 24a issues a command to local data copying logic 314 the secondary system 24b to copy data of the secondary volume2 (FIG. 5b) as of a second point-in-time to a fourth data unit such as volume2', for example, of the secondary system 24b to provide a point-in-time snap copy volume2' of the secondary volume2. In the example of FIG. 5b, the copy relationship between the second volume2 and the point-in-time snap copy volume2' is represented by an arrow labeled "point-in-time (PIT) snap copy relationship4."

Figure 8:
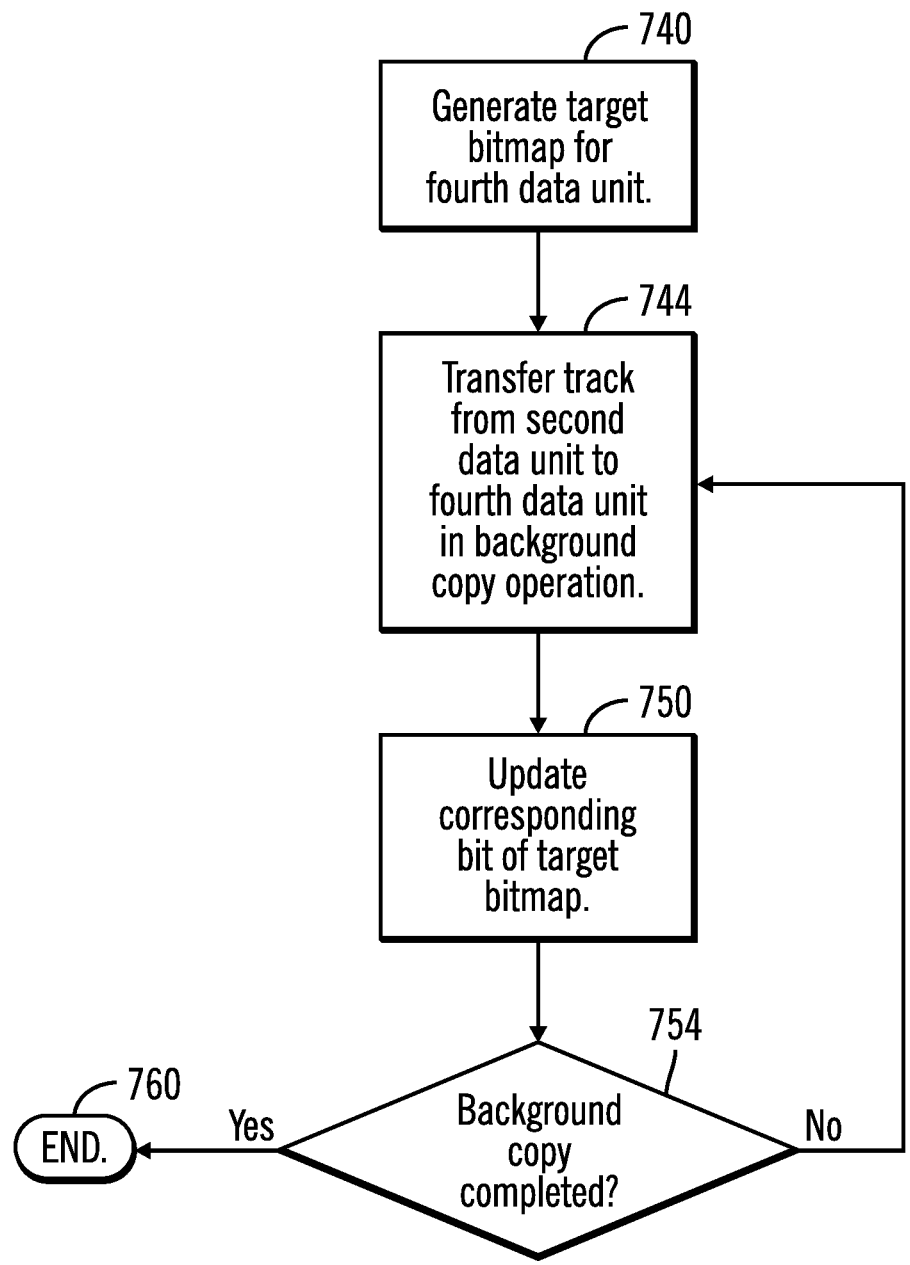
FIG. 8 depicts yet another example of operations of the consistent local and remote copy generator logic of FIG. 4.

FIG. 8 depicts an example of operations of the local data copying logic 314 of the secondary system 24b in response to the point-in-time snap copy command issued to the secondary system 24b (FIG. 2). In one operation, the local data copying logic 314 of the secondary system 24b generates (block 740) a second target bitmap such as the local target bitmap4, for example, of the secondary system 24b, indicating tracks which have not been transferred from the secondary volume2 to the second point-in-time snap copy volume2'. As previously mentioned, in this embodiment, the local target bitmap4 indicates by the bit state 1 of the bits of the bitmap4, tracks which remain to be transferred over to the point-in-time snap copy volume2'.

As previously mentioned, in one embodiment, the point-in-time snap copy command which generates the point-in-time snap copy volume2' may be of a "background copy" type in which the content of the secondary volume2 is transferred (block 744) by the local data copying logic 314 of the secondary system 24b to the point-in-time snap copy volume2' in a background copy operation. Thus, as the content of each track of the secondary volume2 is transferred to the content of the corresponding track of the point-in-time snap copy volume2', the bit state of the bit representing that track in the local target bitmap4 may be updated (block 750) to a bit state value "0" to indicate that the track has been transferred to the point-in-time snap copy volume2'.

For example, FIG. 5d depicts the content "A" of track1 of the secondary volume2 as having been transferred to the corresponding track1 of the point-in-time snap copy volume2'. Accordingly, bit1 of the local target bitmap4 of FIG. 5d is updated to have a bit state of "0" indicating that the content of track1 of the secondary volume2 has been transferred to the content of the corresponding track1 of the point-in-time snap copy volume2'. Similarly, FIG. 5d depicts the content "C" of track3 of the secondary volume2 as having been transferred to the corresponding track3 of the point-in-time snap copy volume2'. Accordingly, bit3 of the local target bitmap4 of FIG. 5d is updated to have a bit state of "0" indicating that the content of track3 of the secondary volume2 has been transferred to the content of the corresponding track3 of the point-in-time snap copy volume2'.

A determination (block 754) is made as to whether all tracks represented by the local target bitmap4 have been transferred from the secondary volume2 to the point-in-time snap copy volume2'. If not, transfers (block 744) of tracks continues. Once it is determined (block 754) that all tracks of the background copy have been transferred, the background copy is complete (block 760). It is appreciated that in other embodiments, the point-in-time snap copy command which generates the point-in-time snap copy volume2' may be of a "no background copy" type in which the content of the secondary volume2 is not transferred to the point-in-time snap copy volume2' in a background copy operation.

In this manner, data for the second point-in-time snap copy volume2' which already resides on the secondary system 24b due to the mirroring operation as represented by the mirror relationship1 (FIG. 5a), may be transferred to the second point-in-time snap copy volume2' within the secondary system 24b. As a result, in many applications most of the data for the second point-in-time snap copy volume2' may be copied within the secondary system 24b and may obviate most copying of data over a network from the primary system 24a to provide the second point-in-time snap copy volume2'. For example, in response to the command logic 320 issuing a point-in-time snap copy command to the secondary system 24b, the local data copying logic 314 of the secondary storage controller 4b, may issue a command to the local data copying logic 314 of the secondary system 24b to background copy tracks of the secondary volume2 to the point-in-time snap copy volume2' if the local target bitmap4 indicates data tracks remain to be transferred from the secondary volume2 to the point-in-time snap copy volume2'.

Referring again to FIG. 7, in another operation, input/output operations from the host are unquiesced (block 766), and the mirroring of data from the first data unit to the second data unit is restarted to restart synchronization of the first data unit and the second data unit. For example, the suspend logic 330 of the consistent local and remote copy generator logic 234 of the primary system 24a unquiesces host input to the primary volume1, and restarts mirroring and thus resynchronization of data from the primary volume1 to the secondary volume2 as indicated by the arrow labeled "mirror relationship1" of FIG. 5c. As a result, updates to the primary volume1 of the primary system 24a may be mirrored to the secondary volume2 of the secondary system 24b while the volume1' and volume2' are being generated to provide consistent point-in-time snap copies of the data of the primary volume1 as of the first point-in-time.

Figure 9:
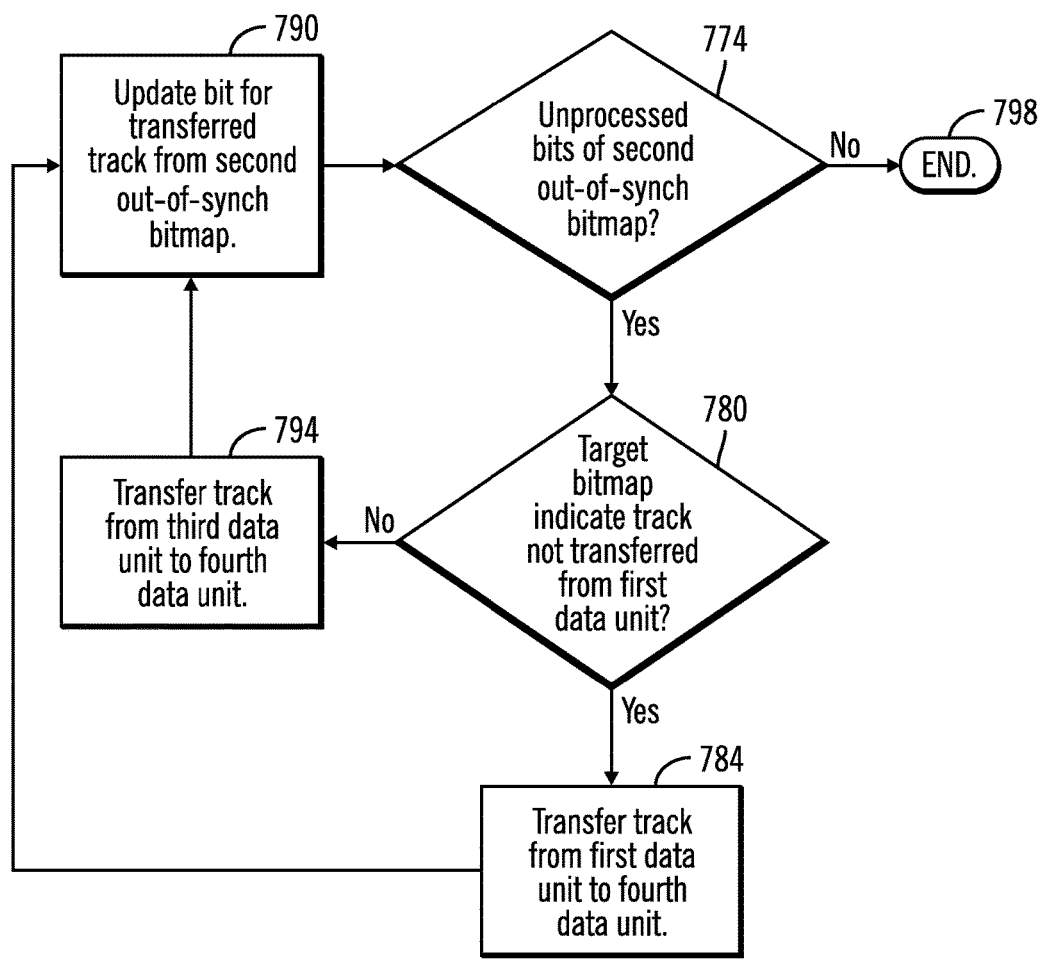
FIG. 9 depicts another example of operations of the consistent local and remote copy generator logic of FIG. 4.

In a manner similar to that described above in connection with block 624 of FIG. 6, the fourth data unit (such as the point-in-time snap copy volume2') may be synchronized (block 770) with respect to the third data unit (such as point-in-time snap copy volume1') wherein both the third and fourth data units provide point-in-time snap copies of the data of the first data unit (such as primary volume1) as of the first point-in-time. FIG. 9 depicts one example of the synchronization operations to synchronize the third and fourth data units to provide point-in-time snap copies of the data of the first data unit (such as primary volume1) as of the first point-in-time.

As noted above, it is appreciated that because the mirror relationship 1 (FIG. 5*a*) of this embodiment is an asynchronous relationship, in some instances not all of the data for the second point-in-time snap copy volume2' may be found on the secondary system 24*b*. Accordingly, in one embodiment, the synchronizing logic 324 synchronizes data of the second point-in-time snap copy volume 2' of the secondary system 24*b* as of the first point-in-time to the data of the first point-in-time snap copy volume1' of the primary system 24*a*. In this manner, additional data for the second point-in-time snap copy volume 2' of the secondary system 24*b* to complete a second point-in-time snap copy volume 2' of the secondary system 24*b* so that it will be consistent as of the first point-in-time, may be obtained by copying selected data from the primary system 24*a*.

In one operation, a determination (block 774) is made as to whether there are unprocessed bits of the second out-of-synch bitmap copied from the first out-of-synch bitmap. For example, in one embodiment, the synchronizing operation includes copying selected data from the first point-in-time snap copy volume1' (or from the primary volume1 if not present on the first point-in-time snap copy volume1') of the primary system 24*a* over the network 6 to the second point-in-time snap copy volume2' of the secondary system 24*b* so that both the first point-in-time snap copy volume1' and the second point-in-time snap copy volume2' provide consistent point-in-time snap copies of the data of the primary volume1 of the primary system 24*a* as of the first point-in-time. Since most of the data needed for the point-in-time snap copy volume 2' of the secondary system may already reside on the secondary system 24*b*, much of the copying of data over a network from the primary system to the secondary system may be obviated when generating consistent point-in-time snap copy volumes of the primary and secondary systems, respectively.

In one embodiment, to obtain data not already on the secondary system 24*b*, the synchronizing logic 324 of the data mirroring logic 310 of the primary system 24*a* determines (block 774) whether unprocessed bits of the remote out-of-synch bitmap1' (FIG. 5*c*) remain to be processed by the mirroring operation represented by the mirror relationship3. For example, FIG. 5*c* depicts the content of bit2 of the remote out-of-synch bitmap1' corresponding to track2 of the first point-in-time snap copy volume1' as having a logic state of "1" indicating that bit2 has not been processed by the mirror relationship3 and that the content of track2 has not yet mirrored pursuant to the mirror relationship3, from the primary system 24*a* to the corresponding volume2' of the secondary system 24*b*. Accordingly, the content of track2 of the second point-in-time snap copy volume2' of the secondary system 24*b* is depicted in FIG. 5*c* as having the content "X" indicating it is not the same content as the content of track2 of the primary volume1 of the primary system 24*a*.

If it is determined (block 774) that an unprocessed bit of the remote out-of-synch bitmap1' (FIG. 5*c*) remains to be processed by the mirroring operation represented by the mirror relationship3, the synchronizing logic 324 of the data mirroring logic 310 of the primary system 24*a* determines (block 780) whether the bit state of the corresponding bit of the target bitmap (local target bitmap3, FIG. 5*c* in this example,) indicates that the associated track has not been transferred to the third data unit (point-in-time snap copy volume1' in this example) from the first data unit (primary volume1 in this example). If the bit state of the corresponding bit of the local target bitmap3 (FIG. 5*c*) does indicate that the associated track has not been transferred to the point-in-time snap copy volume1' from the primary volume1, the content for the track is obtained from the first data unit (primary volume1 in this example) and is mirrored, that is transferred (block 784) to the fourth data unit (point-in-time snap copy volume2' in this example) pursuant to the mirror relationship3 (FIG. 5*d*).

For example, FIG. 5*c* depicts the content of bit2 of the local target bitmap3 corresponding to track2 of the first point-in-time snap copy volume1' as having a logic state of "1" indicating that the content of track2 has not yet been transferred from the primary volume1 of the primary system 24*a* to the first point-in-time snap copy volume1' of the primary system 24*a*. Thus, the content of track2 of the first point-in-time snap copy volume1' of the primary system 24*a* is depicted in FIG. 5*c* as having the content "X" indicating it is not the same content as the content "B" of track2 of the primary volume1 copy volume1'.

Since the content of a track to be mirrored to the point-in-time snap copy volume2' may not have been transferred from the primary volume1 to the point-in-time snap copy volume1' as indicated by the local target bitmap3, the synchronizing logic 324 of the data mirroring logic 310 in copying selected data from the primary system 24*a* to the point-in-time snap copy volume2' to synchronize the data of the point-in-time snap copy volume2' to the primary volume1 as of the first point-in-time, as represented by the point-in-time snap copy volume1', obtains the data for track2 from the primary volume1 and mirrors, that is transfers (block 784) the data to the point-in-time snap copy volume2' if the local target bitmap3 indicates that the data for track2 has not been transferred from the primary volume1 to the point-in-time snap copy volume1'. Thus, a read operation directed to track2 of the point-in-time snap copy volume1' for a mirror operation to second point-in-time snap copy volume2', may be redirected to track2 of the primary volume1 as indicated by the bit state "1" of bit2 of the local target bitmap3 in which bit2 corresponds to track2 of the point-in-time snap copy volume1'. Having obtained the content "B" of track2 of the primary volume1 in a redirected read operation, FIG. 5*d* depicts the content "B" of track2 of the primary volume1 as having been mirrored to the corresponding track2 of the point-in-time snap copy volume2' pursuant to the mirror relationship3. In addition, bit2 of the remote out-of-synch bitmap1' in which bit2 corresponds to track2 of the point-in-time snap copy volume1', may be updated (block 790) to have a bit state value "0" to indicate that the content of track2 has been mirrored to the point-in-time snap copy volume2' as shown in FIG. 5*d*.

Conversely, if the bit state of the corresponding bit of the local target bitmap3 (FIG. 5*c*) indicates that the associated track has been transferred to the point-in-time snap copy volume1' from the primary volume1, the content for the track is mirrored (block 794) from the third data unit (point-in-time snap copy volume1' in this example) to the fourth data unit (point-in-time snap copy volume2' in this example) pursuant to the mirror relationship3 (FIG. 5*d*).

Here too, bit2 of the remote out-of-synch bitmap1' in which bit2 corresponds to track2 of the point-in-time snap copy volume1', may be updated (block 790) to have a bit state value "0" to indicate that the content of track2 has been mirrored to the point-in-time snap copy volume2' as shown in FIG. 5d. Once all bits of the remote out-of-synch bitmap1' are determined (block 774) to have been processed, the synchronization of FIG. 9 is complete (block 798).

In this manner, the synchronizing logic 324 of the data mirroring logic 310 transfers selected data from either the primary volume1 or the point-in-time snap copy volume1' of the primary system 24a to the point-in-time snap copy volume2' of the secondary system 24b, to synchronize the data of the point-in-time snap copy volume2' to the primary volume1 as of the first point-in-time as represented by the point-in-time snap copy volume1' of the primary system 24a. Thus, additional data for the second point-in-time snap copy volume 2' of the secondary system 24b to complete the second point-in-time snap copy volume 2' of the secondary system 24b so that it will be consistent as of the first point-in-time, may be obtained by transferring selected data from the first point-in-time snap copy volume1' or the primary volume1 of the primary system 24a utilizing the asynchronous mirroring of data from the point-in-time snap copy volume1' to the point-in-time snap copy volume2' as represented by the arrow labeled "mirror relationship3" in FIG. 5c.

Figure 10:
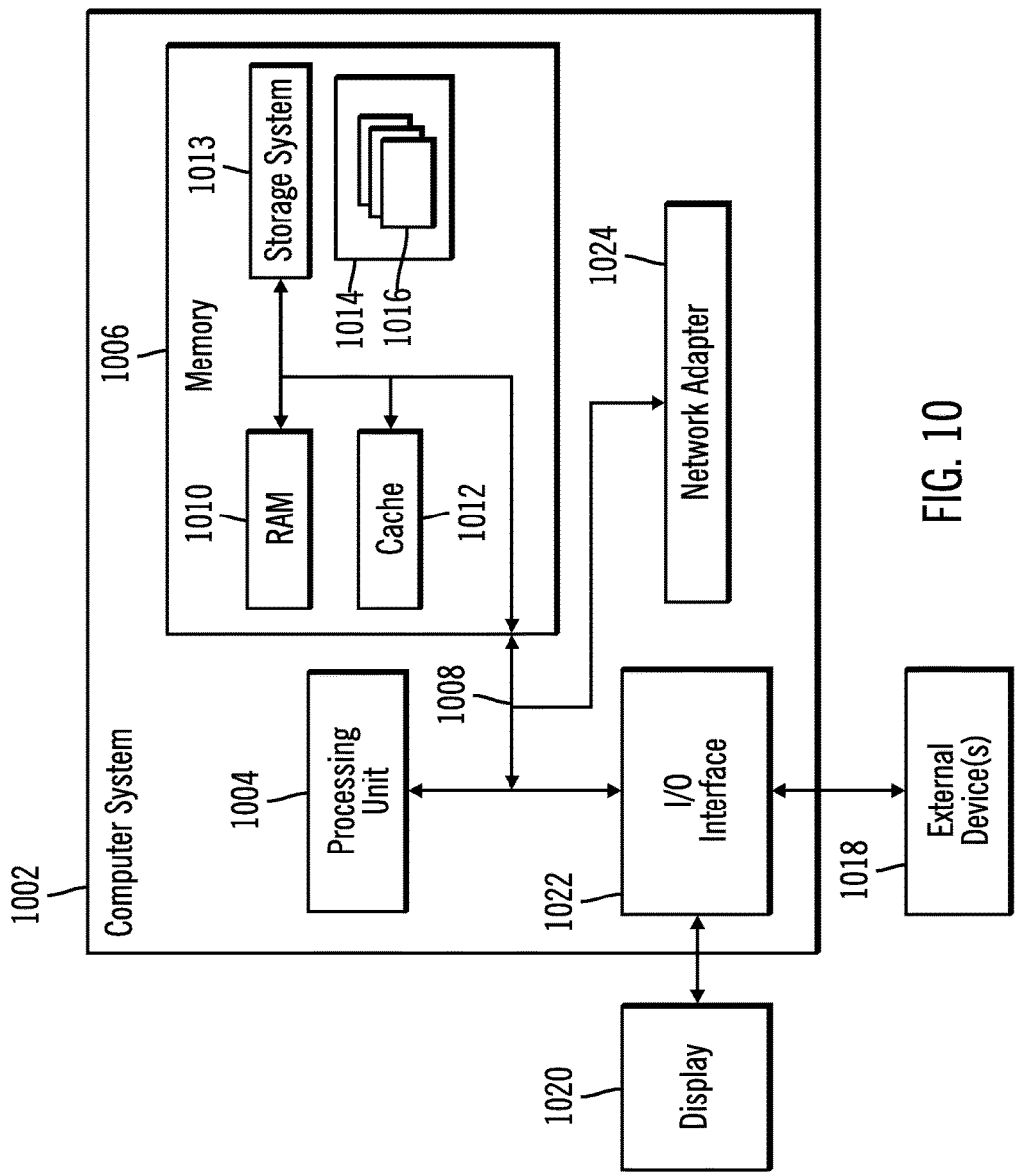
FIG. 10 illustrates a computer embodiment employing asynchronous local and remote generation of consistent point-in-time snap copies in accordance with the present description.

The computational components of the figures may each be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A primary storage controller for use with a host and a primary storage system at a first location, the primary storage system having a primary storage controller and a first storage unit controlled by the primary storage controller and configured to store a plurality of data units, and a secondary storage system at a second location remote from the first location, the secondary storage system having a secondary storage controller and a second storage unit controlled by the secondary storage controller and configured to store a plurality of data units, the primary storage controller comprising consistent local and remote copy generator logic which includes:

data mirroring logic configured to asynchronously mirror data from a first data unit of the first storage unit to a second data unit of the second storage unit;

local data copying logic configured to copy data of the first data unit as of a first point-in-time to a third data unit of the first storage unit to provide a first point-in-time snap copy of the first data unit; and command logic configured to issue a command to the secondary storage system to copy data of the second data unit as of a second point-in-time to a fourth data unit of the second storage unit to provide a second point-in-time snap copy of the second data unit; and wherein the data mirroring logic of the primary storage controller includes synchronizing logic configured to synchronize data of the fourth data unit as of the first point-in-time to the first data unit including transferring selected data from the first data unit to the fourth data unit if selected data has not been transferred from the first data unit to the third data unit and from the third data unit to the fourth data unit if selected data has been transferred from the first data unit to the third data unit so that both the third and fourth data units provide point-in-time snap copies of the data of the first data unit as of the first point-in-time.

2. The system of claim 1 wherein the command logic is further configured to issue to the local data copying logic a first point-in-time snap copy command to copy data of the first data unit as of the first point-in-time to the third data and wherein the local data copying logic is further configured to execute a first point-in-time snap copy command to copy data of the first data unit as of the first point-in-time to the third data unit to provide the first point-in-time snap copy of the first data unit; and wherein the consistent local and remote copy generator logic of the primary storage controller further includes suspend logic configured to quiesce host input to the first data unit, and after quiescing host input to the first data unit, to idle mirroring of data from the first data unit to the second data unit.

3. The system of claim 2 wherein:

wherein the local data copying logic of the consistent local and remote copy generator logic of the primary storage controller is further configured to, in executing the first point-in-time snap copy command, generate a first target bitmap indicating tracks which have not been transferred from the first data unit to the third data unit as of the first point-in-time; and wherein the data mirroring logic of the consistent local and remote copy generator logic of the primary storage controller in mirroring data from the first data unit to the second data unit, is further configured to generate a first out-of-synch bitmap indicating remaining tracks to be mirrored from the first data unit to the second data unit.

4. The system of claim 3 wherein:

the data mirroring logic of the consistent local and remote copy generator logic of the primary storage controller is further configured to copy the first out-of-synch bitmap to a second out-of-synch bitmap to indicate remaining tracks to be mirrored to the fourth data unit; and the command logic in issuing a command to the secondary storage system to copy data of the second data unit as of a second point-in-time to a fourth data unit of the second storage unit, is further configured to issue a second point-in-time snap copy command to the secondary storage system to generate a second target bitmap indicating tracks which have not been transferred from the second data unit to the fourth data unit.

5. The system of claim 4 wherein:

the command logic in issuing a second point-in-time snap copy command to the secondary storage system the local data copying logic of the secondary storage controller, is further configured to command the secondary storage system to background copy tracks of the second data unit to the fourth data unit if the second target bitmap indicates data tracks remain to be transferred from the second data unit to the fourth data unit; and the synchronizing logic of the data mirroring logic in transferring selected data from at least one of the first and third data units to the fourth data unit to synchronize the data of the fourth data unit to the first data unit as of the first point-in-time, is further configured to process the second out-of-synch bitmap and mirror tracks from at least one of the first and third data units to the fourth data unit if indicated as remaining to be mirrored to the fourth data unit.

6. The system of claim 5 wherein:
the synchronizing logic of the data mirroring logic in transferring selected data from at least one of the first and third data units to the fourth data unit to synchronize the data of the fourth data unit to the first data unit as of the first point-in-time, is further configured to obtain data for a data track of the third data unit from the first data unit and mirror the data to the fourth data unit if the first target bitmap indicates that the data track has not been transferred from the first data unit to the third data unit; and
the local data copying logic of the primary storage controller in copying data of the first data unit as of a first point-in-time to a third data unit, is further configured to form a consistency group of the first data unit and the third data unit as of the first point-in-time.

7. The system of claim 2 wherein:
the suspend logic of the primary storage controller is further configured to unquiesce host input to the first data unit, and to restart mirroring of data from the first data unit to the second data unit.

8. The system of claim 1 wherein the first data unit is a first volume and the second data unit is a second volume.

9. A method, comprising:
mirroring data asynchronously from a first data unit stored in a first storage unit at a first location, to a second data unit stored in a second storage unit at a second location;
copying data of the first data unit as of a first point-in-time to a third data unit to initiate a first point-in-time snap copy of the first data unit;
copying data of the second data unit as of a second point-in-time to a fourth data unit to initiate a second point-in-time snap copy of the second data unit; and
synchronizing the data of the fourth data unit to data of the first unit as of the first point-in-time, the synchronizing including transferring selected data from the first data unit to the fourth data unit if selected data has not been transferred from the first data unit to the third data unit and from the third data unit to the fourth data unit if selected data has been transferred from the first data unit to the third data unit so that both the third and fourth data units provide point-in-time snap copies of the data of the first data unit as of the first point-in-time.

10. The method of claim 9 wherein copying data of the first data unit as of a first point-in-time to a third data unit includes executing a first point-in-time snap copy command, the method further comprising:
quiescing host input to the first data unit; and
after quiescing host input/output to the first data unit, idling mirroring of data from the first data unit to the second data unit.

11. The method of claim 10 wherein:
executing the first point-in-time snap copy command includes generating a first target bitmap indicating tracks which have not been transferred from the first data unit to the third data unit as of the first point-in-time; and
mirroring data from the first data unit to the second data unit includes generating a first out-of-synch bitmap indicating remaining tracks to be mirrored from the first data unit to the second data unit.

12. The method of claim 11 further comprising copying the first out-of-synch bitmap to a second out-of-synch bitmap to indicate remaining tracks selected to be transferred from at least one of the first data unit and the third data unit to the fourth data unit, and wherein copying data of the second data unit as of the second point-in-time to a fourth data unit includes executing a second point-in-time snap copy command, generating a second target bitmap indicating tracks which have not been transferred from the second data unit to the fourth data unit as of the second point-in-time.

13. The method of claim 12 wherein:
copying data of the second data unit as of second point-in-time to a fourth data unit further includes background copying tracks of the second data unit to the fourth data unit if the second target bitmap indicates data tracks remain to be transferred from the second data unit to the fourth data unit; and
transferring selected data from at least one of the first data unit and the third data unit to the fourth data unit to synchronize the data of the fourth data unit to the first data unit as of the first point-in-time includes processing the second out-of-synch bitmap and mirroring tracks from the at least one of the first data unit and the third data unit to the fourth data unit if indicated as remaining to be mirrored to the fourth data unit.

14. The method of claim 13 wherein:
mirroring tracks from at least one of the first data unit and the third data unit to the fourth data unit includes obtaining data for a data track of the third data unit from the first data unit and mirroring the obtained data to the fourth data unit if the first target bitmap indicates that the data track has not been transferred from the first data unit to the third data unit; and
copying data of the first data unit as of a first point-in-time to a third data unit includes forming a consistency group of the first data unit and the third data unit as of the first point-in-time.

15. The method of claim 10 further comprising:
unquiescing host input to the first data unit; and
restarting mirroring of data from the first data unit to the second data unit.

16. The method of claim 9 wherein the first data unit is a first volume and the second data unit is a second volume.

17. A computer program product for use with a host and a primary storage system at a first location, the primary storage system having a primary storage controller and a first storage unit controlled by the primary storage controller and configured to store a plurality of data units, and a secondary storage system at a second location remote from the first location, the secondary storage system having a secondary storage controller and a second storage unit controlled by the secondary storage controller and configured to store a plurality of data units, wherein the computer program product comprises a computer readable storage medium having program instructions embodied therewith, the program instructions executable by a processor a storage system to cause processor operations, the processor operations comprising:
mirroring data asynchronously from a first data unit stored in a first storage unit at a first location, to a second data unit stored in a second storage unit at a second location;
copying data of the first data unit as of a first point-in-time to a third data unit to initiate a first point-in-time snap copy of the first data unit;
copying data of the second data unit as of a second point-in-time to a fourth data unit to initiate a second point-in-time snap copy of the second data unit; and synchronizing the data of the fourth data unit to data of the first unit as of the first point-in-time, the synchronizing including copying selected data from the first data unit to the fourth data unit if selected data has not been transferred from the first data unit to the third data unit and from the third data unit to the fourth data unit if selected data has been transferred from the first data unit to the third data unit so that both the third and fourth data units provide point-in-time snap copies of the data of the first data unit as of the first point-in-time.

18. The computer program product of claim 17 wherein copying data of the first data unit as of a first point-in-time to a third data unit includes executing a first point-in-time snap copy command, the operations further comprising:
quiescing host input to the first data unit; and
after quiescing host input/output to the first data unit, idling mirroring of data from the first data unit to the second data unit.

19. The computer program product of claim 18 wherein:
executing the first point-in-time snap copy command includes generating a first target bitmap indicating tracks which have not been transferred from the first data unit to the third data unit as of the first point-in-time; and
mirroring data from the first data unit to the second data unit includes generating a first out-of-synch bitmap indicating remaining tracks to be mirrored from the first data unit to the second data unit.

20. The computer program product of claim 19 wherein the operations further comprise copying the first out-of-synch bitmap to a second out-of-synch bitmap to indicate remaining tracks selected to be transferred from at least one of the first data unit and the third data unit to the fourth data unit, and wherein copying data of the second data unit as of the second point-in-time to a fourth data unit includes executing a second point-in-time snap copy command, generating a second target bitmap indicating tracks which have not been transferred from the second data unit to the fourth data unit as of the second point-in-time.

21. The computer program product of claim 20 wherein:
copying data of the second data unit as of second point-in-time to a fourth data unit further includes background copying tracks of the second data unit to the fourth data unit if the second target bitmap indicates data tracks remain to be transferred from the second data unit to the fourth data unit; and
transferring selected data from at least one of the first data unit and the third data unit to the fourth data unit to synchronize the data of the fourth data unit to the first data unit as of the first point-in-time includes processing the second out-of-synch bitmap and mirroring tracks from the at least one of the first data unit and the third data unit to the fourth data unit if indicated as remaining to be mirrored to the fourth data unit.

22. The computer program product of claim 21 wherein:
mirroring tracks from at least one of the first data unit and the third data unit to the fourth data unit includes obtaining data for a data track of the third data unit from the first data unit and mirroring the obtained data to the fourth data unit if the first target bitmap indicates that the data track has not been transferred from the first data unit to the third data unit; and
copying data of the first data unit as of a first point-in-time to a third data unit includes forming a consistency group of the first data unit and the third data unit as of the first point-in-time.

23. The computer program product of claim 18 wherein the operations further comprise:
unquiescing host input to the first data unit; and
restarting mirroring of data from the first data unit to the second data unit.

24. The computer program product of claim 17 wherein the first data unit is a first volume and the second data unit is a second volume.

* * * * *